US008565411B2

(12) United States Patent
Kannan et al.

(10) Patent No.: US 8,565,411 B2
(45) Date of Patent: Oct. 22, 2013

(54) METHOD AND APPARATUS FOR OPTIMIZING CUSTOMER SERVICE ACROSS MULTIPLE CHANNELS

(75) Inventors: Pallipuram V. Kannan, Los Gatos, CA (US); Ravi Vijayaraghavan, Bangalore (IN)

(73) Assignee: 24/7 Customer, Inc., Campbell, CA (US)

( * ) Notice: Subject to any disclaimer, the term of this patent is extended or adjusted under 35 U.S.C. 154(b) by 213 days.

(21) Appl. No.: 12/973,630

(22) Filed: Dec. 20, 2010

(65) Prior Publication Data

US 2011/0158398 A1 Jun. 30, 2011

Related U.S. Application Data

(60) Provisional application No. 61/289,845, filed on Dec. 23, 2009, provisional application No. 61/292,812, filed on Jan. 6, 2010, provisional application No. 61/361,646, filed on Jul. 6, 2010.

(51) Int. Cl.
*H04M 3/00* (2006.01)
*H04M 5/00* (2006.01)

(52) U.S. Cl.
USPC .................................. 379/265.13; 379/266.02

(58) Field of Classification Search
USPC .......... 379/265, 266; 370/352, 353, 354, 355, 370/356, 357
See application file for complete search history.

(56) References Cited

U.S. PATENT DOCUMENTS

| | | | | |
|---|---|---|---|---|
| 6,377,944 | B1 * | 4/2002 | Busey et al. | 1/1 |
| 6,389,132 | B1 * | 5/2002 | Price | 379/265.01 |
| 6,529,936 | B1 | 3/2003 | Mayo et al. | |
| 6,819,759 | B1 | 11/2004 | Khuc et al. | |
| 7,949,122 | B1 * | 5/2011 | Taylor et al. | 379/265.02 |
| 2006/0026534 | A1 * | 2/2006 | Ruthfield et al. | 715/854 |
| 2006/0098803 | A1 * | 5/2006 | Bushey et al. | 379/266.02 |
| 2007/0198368 | A1 | 8/2007 | Kannan et al. | |
| 2007/0206584 | A1 * | 9/2007 | Fulling et al. | 370/356 |
| 2007/0265873 | A1 | 11/2007 | Sheth et al. | |
| 2007/0293200 | A1 * | 12/2007 | Roundtree et al. | 455/414.1 |
| 2008/0084975 | A1 | 4/2008 | Schwartz | |
| 2009/0003579 | A1 | 1/2009 | Singh et al. | |
| 2009/0030984 | A1 * | 1/2009 | Chen et al. | 709/204 |
| 2009/0327441 | A1 * | 12/2009 | Lee et al. | 709/206 |
| 2010/0054452 | A1 * | 3/2010 | Afzal | 379/265.11 |
| 2010/0274637 | A1 * | 10/2010 | Li et al. | 705/11 |
| 2010/0312706 | A1 * | 12/2010 | Combet et al. | 705/50 |
| 2011/0069821 | A1 * | 3/2011 | Korolev et al. | 379/88.04 |

FOREIGN PATENT DOCUMENTS

WO WO-2004017550 2/2004

* cited by examiner

*Primary Examiner* — Mohammad Islam
*Assistant Examiner* — Kharye Pope
(74) *Attorney, Agent, or Firm* — Michael A. Glenn; Perkins Coie LLP

(57) ABSTRACT

A method and apparatus for a computer-implemented technique for maximizing customer satisfaction and first call resolution, including converting telephone calls into online chats, while minimizing cost is provided. Techniques for incorporating analytics as applied to customer data into particular strategies for call deflection, targeting particular individuals to increase chat acceptance rate, and computing a customer's wait time are also provided.

17 Claims, 21 Drawing Sheets

FIG. 4

(Deflection Potential From Abandoned Calls (20% acceptance)) 402

| ASA (sec) | Total Calls | Abandon % | Potential Chat Population | Hot Lead | Total Chats |
|---|---|---|---|---|---|
| <=19 | 12011 | 4.6% | 0% | 0 | 0 |
| 20-49 | 28408 | 8.1% | 100% | 2310 | 462 |
| 50-99 | 14174 | 9.8% | 100% | 1391 | 278 |
| 100-164 | 67222 | 9.7% | 100% | 6551 | 1310 |
| 165-199 | 66487 | 13.0% | 100% | 8639 | 1728 |
| 200-224 | 54963 | 11.4% | 100% | 6258 | 1252 |
| 225-284 | 44691 | 14.1% | 100% | 6322 | 1264 |
| 285-334 | 42460 | 16.2% | 100% | 6880 | 1376 |
| 335+ | 16895 | 29.3% | 100% | 4955 | 991 |
| Grand Total | 347311 | | | 43306 | 8661 |

(Deflection Potential From Long Wait Times (5% acceptance)) 404

| ASA (sec) | Total Calls | Abandon % | Potential Chat Population | Hot Lead | Total Chats |
|---|---|---|---|---|---|
| <=19 | 12011 | 4.6% | 0% | 0 | 0 |
| 20-49 | 28408 | 8.1% | 0% | 0 | 0 |
| 50-99 | 14174 | 9.8% | 40% | 5670 | 283 |
| 100-164 | 67222 | 9.7% | 60% | 40333 | 2017 |
| 165-199 | 66487 | 13.0% | 80% | 53190 | 2659 |
| 200-224 | 54963 | 11.4% | 100% | 54963 | 2748 |
| 225-284 | 44691 | 14.1% | 100% | 44691 | 2235 |
| 285-334 | 42460 | 16.2% | 100% | 42460 | 2123 |
| 335+ | 16895 | 29.3% | 100% | 16895 | 845 |
| Grand Total | 347311 | | | 258201 | 12910 |

406

| Chat Volume Estimation | |
|---|---|
| Total Chats Taken | 21,571 |
| AHT in Minutes | 15 |
| Concurrency | 1.5 |
| hours per day | 8 |
| Utilization % | 85.0% |
| Number of chats/day/agent | 41 |
| Number of chats per month/agent | 1224 |

Chat potential based only on deflection of 24/7 Volumes

408

| | |
|---|---|
| Number of agents | 21 |

Deriving the Service Chat Funnel from Web Analytics Data...........

| Oct Visits | Nov Visits | Avg Visitor/Month | Category | Level | Hot Leads/Rate | Chats |
|---|---|---|---|---|---|---|
| 15,453 | 13,404 | 14,429 | Activation | 3 | 5771 | 693 |
| 11,660 | 13,300 | 12,480 | Activation | 3 | 4992 | 599 |
| 11,178 | 11,586 | 11,382 | Activation | 3 | 4553 | 546 |
| 13,355 | 1,021 | 7,188 | Activation | 4 | 5032 | 604 |
| 757 | 873 | 815 | Activation | 4 | 571 | 68 |
| 903 | 928 | 916 | Activation | 4 | 641 | 77 |
| 985 | 775 | 880 | Activation | 4 | 616 | 74 |
| 918 | 814 | 866 | Activation | 4 | 606 | 73 |
| 108,443 | 105,055 | 106,749 | FAQs | 3 | 42700 | 5124 |
| 13,484 | 14,181 | 13,833 | FAQs | 4 | 9683 | 1162 |
| 3,663 | 5,363 | 4,513 | FAQs | 4 | 3159 | 379 |
| 27,661 | 27,661 | 27,661 | Customer Support | 2 | 6915 | 692 |
| 7,618 | 10,226 | 8,922 | Customer Support | 3 | 3569 | 428 |
| 7,486 | 7,289 | 7,388 | Customer Support | 3 | 2955 | 355 |
| 4,319 | 3,901 | 4,110 | Customer Support | 3 | 1644 | 197 |
| 3,795 | 3,601 | 3,698 | Customer Support | 4 | 2589 | 311 |
| 915 | 1,207 | 1,061 | Customer Support | 4 | 743 | 89 |
| 1,992 | 454 | 1,223 | Customer Support | 4 | 856 | 103 |
| 985 | 775 | 880 | Customer Support | 4 | 616 | 74 |
| 1,522 | 1,600 | 1,561 | Customer Support | 4 | 1093 | 131 |
| 915 | 1,207 | 1,061 | Customer Support | 4 | 743 | 89 |
| 95,127 | 101,629 | 98,378 | Download | 3 | 39351 | 4722 |
| 86,141 | 35,659 | 60,900 | Download | 3 | 24360 | 2923 |
| 82,874 | 95,369 | 89,122 | Download | 3 | 35649 | 4278 |
| 69,648 | 81,745 | 75,697 | Download | 3 | 30279 | 3633 |
| 3,024 | 3,061 | 3,043 | Download | 4 | 2130 | 256 |
| 14,853 | 14,310 | 14,582 | Download | 4 | 10207 | 1225 |

Estimating Hot Leads and Chats

FIG. 8

Based on voice call distribution and web containment

| Category/Level → | LVL 1 Visitors | LVL 1 HL Rate | LVL 1 HL Count | LVL 2 Visitors | LVL 2 HL Rate | LVL 2 HL Count | LVL 3 Visitors | LVL 3 HL Rate | LVL 3 HL Count | LVL 4 Visitors | LVL 4 HL Rate | LVL 4 HL Count | Average Visitors /Month | Hot Lead | Chat Acceptance |
|---|---|---|---|---|---|---|---|---|---|---|---|---|---|---|---|
| Activation | | | | | | | 124729 | 40% | 49892 | 42172 | 70% | 29520 | 154428 | 79412 | 7941 |
| ID Problem | | | | | | | 106749 | 40% | 42700 | 18346 | 70% | 12842 | 114420 | 55542 | 5554 |
| Customer Support | | | | 27664 | 20% | 5532 | 302063 | 60% | 181238 | 41727 | 80% | 33382 | 335712 | 220151 | 22015 |
| Download | | | | | | | 324096 | 60% | 194458 | 53328 | 80% | 42662 | 345014 | 237120 | 23712 |
| Education | | | | | | | 17081 | 30% | 5124 | | | | 15372 | 5124 | 512 |
| Installation | | | | | | | 109544 | 60% | 65726 | 203904 | 80% | 163123 | 302494 | 228850 | 22885 |
| Main | 552119 | 10% | 55212 | 546659 | 20% | 109332 | | | | | | | 851416 | 164544 | 16454 |
| Product Usage | | | | | | | | | | 571858 | 80% | 457486 | 571858 | 457486 | 45749 |
| Support Programs | | | | | | | | | | 94076 | 70% | 65853 | 94076 | 65853 | 6585 |
| Upgrade | | | | | | | 2978 | 30% | 893 | 4278 | 40% | 1711 | 6957 | 2604 | 260 |
| Order Status | | | | | | | 6540 | 30% | 1962 | 4154 | 40% | 1662 | 10040 | 3623 | 362 |
| Unexpected Behavior | | | | | | | | | | 82936 | 70% | 58055 | 82936 | 58055 | 5805 |
| Return/Exchange/ Refund | | | | | | | | | | 4183 | 40% | 1673 | 4183 | 1673 | 167 |
| Printing | | | | | | | | | | | | | | | |
| Support | | | | | | | | | | | | | | | |
| Free | | | | | | | | | | | | | | | |
| Grand Total | 552119 | | 55212 | 574320 | | 114864 | 993778 | | 541992 | 1120960 | | 867969 | 2888905 | 1580037 | 158004 |

| | |
|---|---|
| Total Number of Chats | 158,004 |
| Chat AHT (Minutes) | 20 |
| Concurrency | 2 |
| Hours per Day | 8 |
| Number of chats/day/agent | 48 |
| Number of Chats per month/agent | 1,440 |
| Utilization% | 75% |
| Number of agents | 146 |

FIG. 9

*The Business Model - Overall Potential*

*Illustrative Example*

| | |
|---|---|
| *Voice call AHT (Minutes)* | *15* |
| *Total calls* | *274,000* |
| *Number of chats through web containment* | *65,151* |
| *Number of chat agents (web containment)* | *60* |
| *FCR Ratio (chat vs. voice)* | *1* |
| ***% Reduction Thru Web Containment*** | ***24%*** |
| ***% Reduction Thru Behavioral changes*** | ***15%*** |
| ***Total Number of Chats*** | ***106,251*** |
| ***Total Number of Agents (Containment + Deflection)*** | ***98*** |
| ***Total*** | ***39%*** |
| ***Total chats per month*** | ***106251*** |
| ***Cost per voice call*** | ***$ 3.55*** |
| | |
| *Cost per chat agent per month* | *$1,950* |
| *Chats per agents per month* | *1440* |
| *Cost per chat* | *$1.35* |
| *Cost Savings per chat* | *$ 2.20* |
| *% Gainshare on cost savings* | *0%* |
| | |
| *24/7 Contact center revenues per month* | *$191,842.68* |
| *24/7 Ilabs revenues per month* | *$ -* |
| *24/7 Total Revenues per month* | *$191,842.68* |
| | |
| ***Yearly Revenues*** | ***$2,302,112.14*** |

*FIG. 11*

- Peak-times between 06.00Hrs to 14.00 hrs (PST) for visitors & calls
- Broad rules management based on time of day will lead to deflection of calls
- 80% positive correlation between call and chat volume distribution
- Segment level chat and voice data will allow better understanding of the relationships between call and chat potential Identifying and Servicing the 'Right' Segments - Example Priority Grid for Chat Solution

1702

| User Rating | | | |
|---|---|---|---|
| High | P9 HL Rate: 50% | P8 HL Rate: 50% | P7 HL Rate: 50% |
| Medium | P6 HL Rate: 60% | P5 HL Rate: 60% | P2 HL Rate: 80% |
| Low | P4 HL Rate: 75% | P3 HL Rate: 80% | P1 HL Rate: 90% |
| | Low | Medium | High |

Exit Rate

Approach

- Segmentation of URLs by exit rates and user ratings
- Target Segments based on propensity to chat

1704

| Grid Rule | Page Categories | Sessions per Month (#) | Proposed TOP (Secs) | Hot Lead Rate | Total Visitors /Per Rule (#) | Total Invites (#) | Total Chats Accepted (#) |
|---|---|---|---|---|---|---|---|
| P1 - | Activation | 880 | 15 | 90% | 792 | 713 | 86 |
| P2 - | Installation | 16,416 | 15 | 80% | 13,133 | 11,820 | 1,418 |
| P3 - | License | 27,851 | 20 | 80% | 22,280 | 20,052 | 2,406 |
| P4 - | FAQ | 60,199 | 30 | 75% | 45,149 | 40,634 | 4,876 |
| P5 - | Tech Note - Error | 6,404 | 70 | 60% | 3,842 | 3,458 | 415 |
| P6 - | TroubleShoot Steps | 25,093 | 70 | 60% | 15,056 | 13,550 | 1,626 |
| P7 - | Tech Note - Serial Number | 3,561 | 90 | 50% | 1,781 | 1,602 | 192 |
| P8 - | Non technical - License | 6,553 | 100 | 50% | 3,276 | 2,949 | 354 |
| P9 - | Tech Note - Well Documented | 11,944 | 120 | 50% | 5,972 | 5,375 | 645 |
| | | | | | | | 12,018 |

FIG. 17

Text Mining can fine tune identification of the right pages

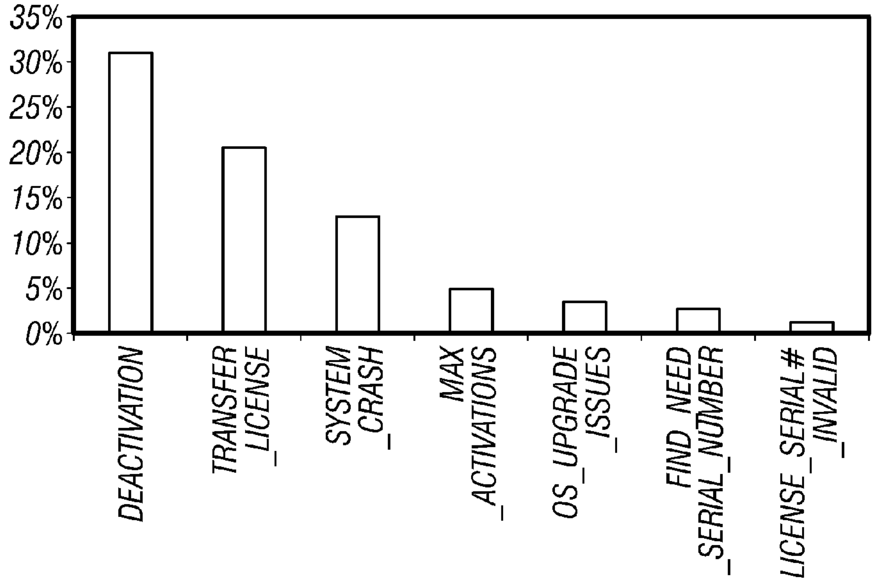

| CATEGORIES | DESCRIPTION |
|---|---|
| DEACTIVATION | Customer is talking about deactivating the software |
| MAX_ACTIVATIONS | Customer has reached maximum number of activations. Customer trying to activate on new system without deactivating on old computer. |
| SYSTEM_CRASH | Computer/Hard Drive crashed, customer couldn't deactivate the software. |
| TRANSFER_LICENSE | Customer trying to move the software from one system to other. Facing problem like didn't activate the software on old machine, lost serial number, couldn't find install file. |
| OS_UPGRADE_ISSUES | Customer not able to activate the software after upgrading the operating system. |
| FIND_NEED_SERIAL_NUMBER | Customer is not able to find/locate the serial number. |
| LICENSE_SERIAL_NO._INVALID | Serial number is Invalid. |

*FIG. 18*

Multivariate modeling to structure rule optimization

The response to be optimized is acceptance rate - Collect data from transcript reports -

Key attributes influencing acceptance rates-

| | |
|---|---|
| Entry/Exit/Journey history | Time on page |
| Time on site | Page Views |
| Search behavior | Time of day/Day of week |
| Issue/Page type | Page level |
| Recency of previous visit | Chat Transcript data |

2002

Logit Model

$$P(Y = \text{Acceptance} \mid x_1, x_2 \ldots\ldots x_n) = \frac{e^{\Psi}}{1 + e^{\Psi}}$$

$$\Psi = \beta_0 + \beta_1 x_1 + \beta_2 x_2 \ldots\ldots\ldots \beta_n x_n$$

Estimating $\beta$ coefficients

METHOD AND APPARATUS FOR OPTIMIZING CUSTOMER SERVICE ACROSS MULTIPLE CHANNELS

CROSS REFERENCE TO RELATED APPLICATIONS

This patent application claims priority to U.S. provisional patent application Ser. No. 61/289,845, Revenue Calculation, filed Dec. 23, 2009; U.S. provisional patent application Ser. No. 61/292,812, Call Deflection Strategies, filed Jan. 6, 2010; and U.S. provisional patent application Ser. No. 61/361,646, Wait Time and Queue Choices: Predicting Customer Choices, filed Jul. 6, 2010, the entirety of each of which are incorporated herein by this reference thereto.

BACKGROUND OF THE INVENTION

1. Technical Field

This invention relates generally to the field of computer-implemented customer service techniques. More specifically, this invention relates to a computer-implemented technique for maximizing customer satisfaction and first call resolution, including converting telephone calls into online chats, while minimizing cost.

2. Description of the Related Art

Offering Web based self-service, has been around for many years with the intention of providing answers to customers on a particular website. One objective of Web based self service is to prevent the need for customers on a particular website to have to call a contact center when such customers are not getting answers to the questions or, put plainly, not getting their needs met. It has been found that despite companies investing in self service and other customer service tools, companies are not seeing the anticipated decrease in phone contact volumes from such self service tools. One reason has been found to be an inability of such self service and management tools to resolve problems online. It has been contemplated that one reason for this inability to resolve problems online is due to generic, knowledge based, and current approaches that are not customized.

It would be desirable to provide techniques that maximize customer satisfaction, e.g. including first call resolution, while at the same time minimizing cost.

SUMMARY OF THE INVENTION

A method and apparatus for a computer-implemented technique for maximizing customer satisfaction and first call resolution, including converting telephone calls into online chats, while minimizing cost is provided. Techniques for incorporating analytics as applied to customer data into particular strategies for call deflection, targeting particular individuals to increase chat acceptance rate, and computing a customer's wait time are also provided.

BRIEF DESCRIPTION OF THE DRAWINGS

FIG. 4 is a schematic diagram showing data about chat volume estimation based on actual anonymous data, according to an embodiment.

FIG. 8 is a chart of visits for a particular month, the average number of visitors per month, the category, the level, the hot lead rate, and the number of chats per each particular URL, according to an embodiment;

FIG. 9 shows a top chart of data related to chat acceptance for each category and a bottom chart of the derived number of agents, according to an embodiment;

FIG. 11 is a table reflecting an example business model, according to an embodiment;

FIG. 17 is a schematic diagram presenting two tables for identifying and servicing optimal segments of URLs by exit rates and user ratings, according to an embodiment;

FIG. 18 is a schematic diagram showing a histogram graph and a table for using text mining to fine tune the identification of pages to target for chat, according to an embodiment;

FIG. 20 is a schematic diagram illustrative an example model for structuring rule optimization, according to an embodiment.

DETAILED DESCRIPTION OF THE INVENTION

A method and apparatus for a computer-implemented technique for maximizing customer satisfaction and first call resolution, including converting telephone calls into online chats, while minimizing cost is provided. Techniques for incorporating analytics as applied to customer data into particular strategies for call deflection, targeting particular individuals to increase chat acceptance rate, and computing a customer's wait time are also provided.

It should be appreciated that the methodology described hereinbelow may be used in a sales or a service situation and that particular details to either situation are for illustrative purposes only and are not meant to be limiting.

Abandon Rate

Figure 1:
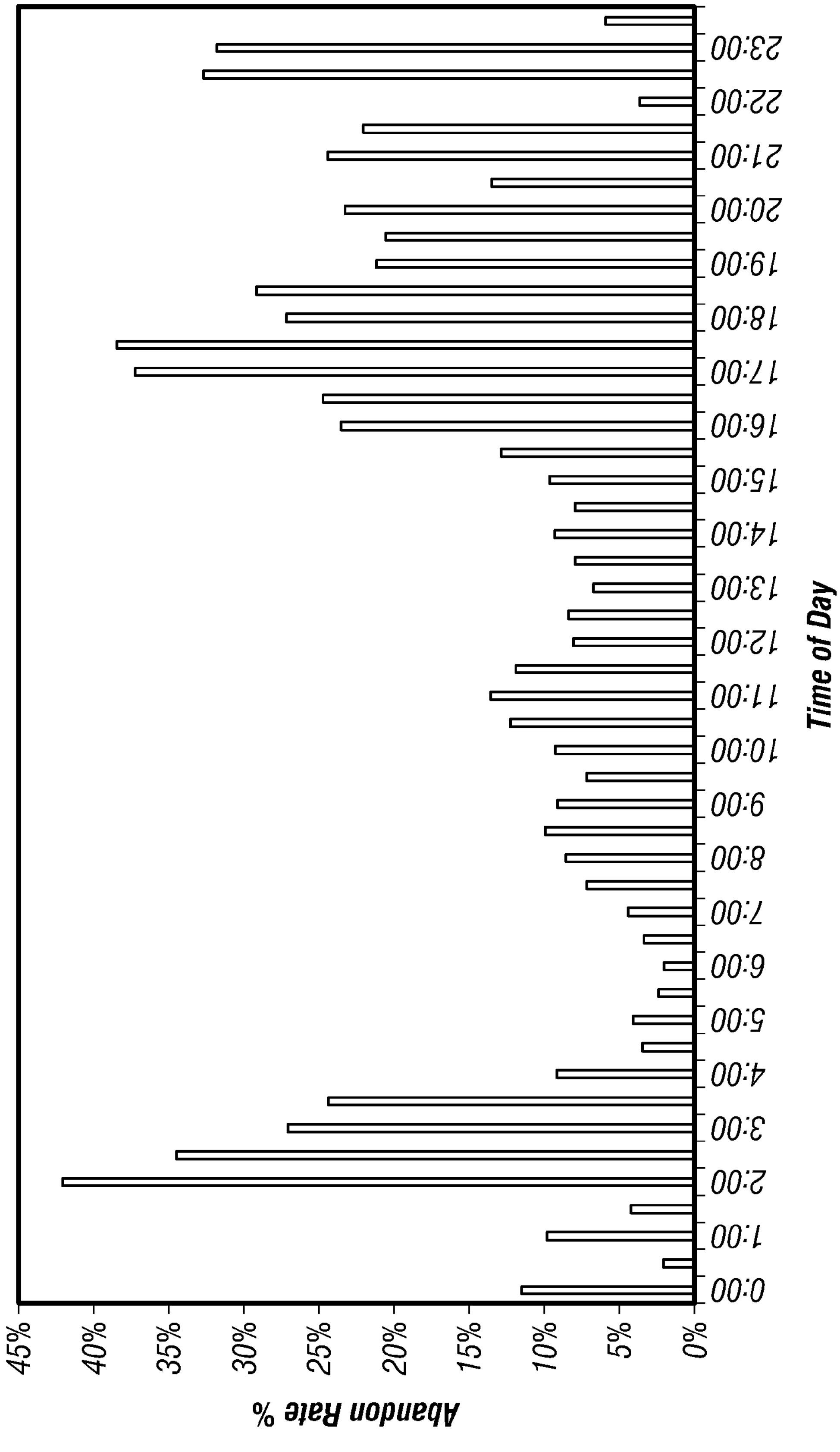
FIG. 1 is a graph showing that the abandon rate may vary across different times of a given day, according to an embodiment.

In an embodiment, one metric for a call center is abandon rate, which is the percentage of a population who abandon a particular call. For example, an individual from the population might drop the call because the individual waited too long or due to an unrelated reason. FIG. 1 is a graph showing that the abandon rate may vary across different times of a given day. Put another way, people do not uniformly abandon telephone calls. For example, referring to FIG. 1, the abandon rate between 2:00 am and 4:00 am in the morning is between 25 percent and about 43 percent, whereas the abandon rate percent between 5:00 am and 7:00 am is at about five percent. Thus, as can be gleaned from the data shown in FIG. 1, a clear opportunity exists, e.g. where the abandon rate is high, to drive up customer experience, e.g. aim to reduce the abandon rate, and, thus, drive up revenue.

According to an embodiment, it may be assumed that when the abandon rates are high, wait times may also be high, which means that there is clearly an opportunity to be able to serve these customers better by providing them opportunities in other channels. Examples of such channels may include, but are not limited to, online chat, online self service, and online assisted self service.

Call Deflection—Dedicated Queue for Chat

In an embodiment, one technique for reducing the abandon rate is call deflection, e.g. deflect a particular customer from the call channel to another channel, such as, for example, online chat. The aim is to direct some of these callers to a channel, such as the web, where they can be served right away.

Figure 2:
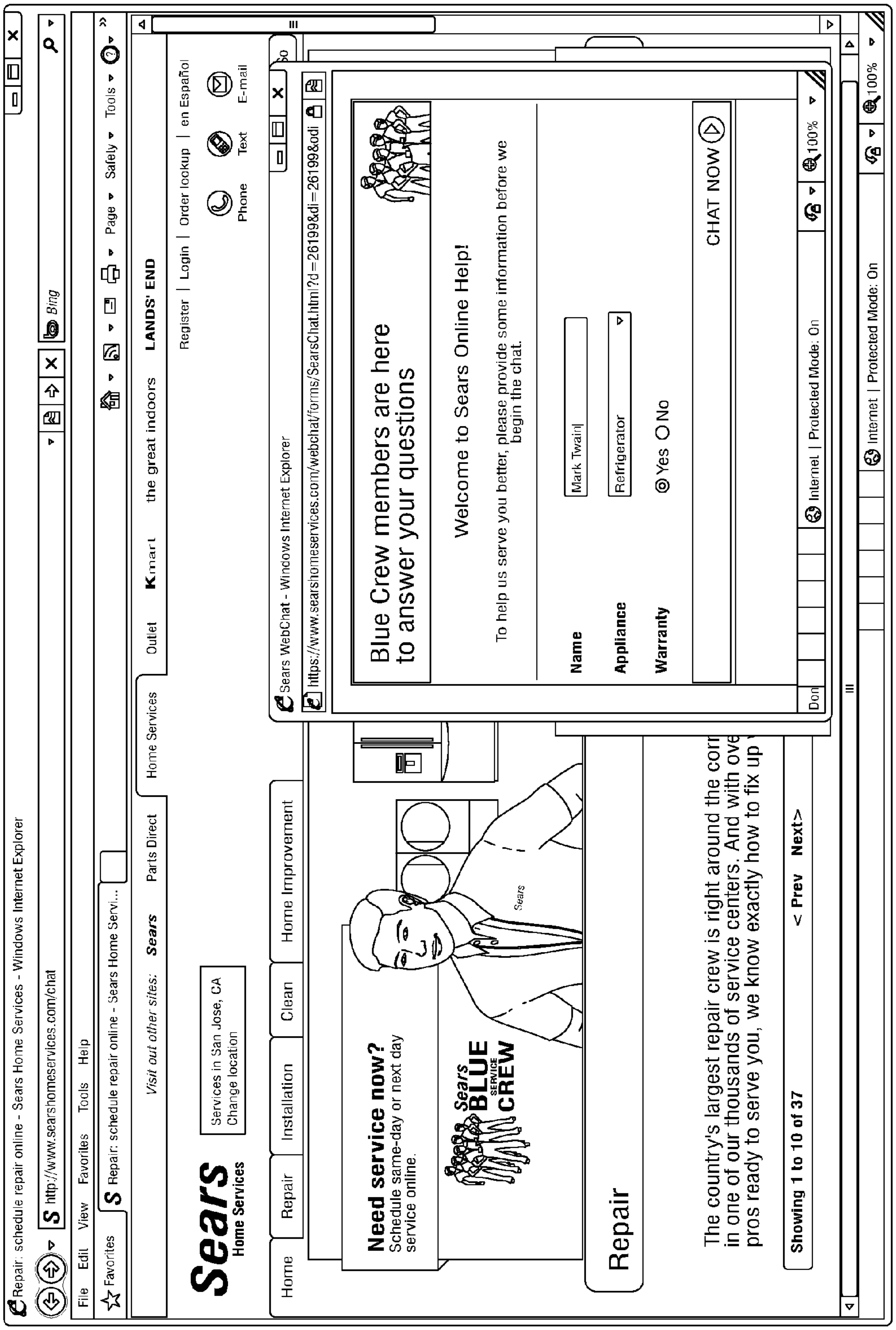
FIG. 2 shows an example dedicated Web page for a particular merchant's website for chat, according to an embodiment.

An embodiment can be understood with reference to FIG. 2. FIG. 2 shows an example dedicated Web page for a particular merchant's website with a popup chat window overlaying the Web page. In an example scenario, for a customer waiting on a voice channel for a customer service representative or for some other type of assistance, an interactive voice response (IVR) message is played. The IVR message conveys a message that the customer may be served more quickly on another channel. In an embodiment, the IVR message directs customers to a dedicated URL for Chat. For example, the IVR message may convey a message such as, "If you would like to be served more quickly, please go to our Chat service." As well, in an embodiment, the IVR message provides a "simple-to-remember" URL. For example, the recited URL may be simple, such as, "www.MerchantnameChat.com". That is, in the voice channel the message recites a URL that is easy to remember. Thus, the customer may quickly type in the URL that links to a dedicated queue for chat, to which the customer is placed right away.

Potential Population can be Estimated from Call Center Data

Figure 3:
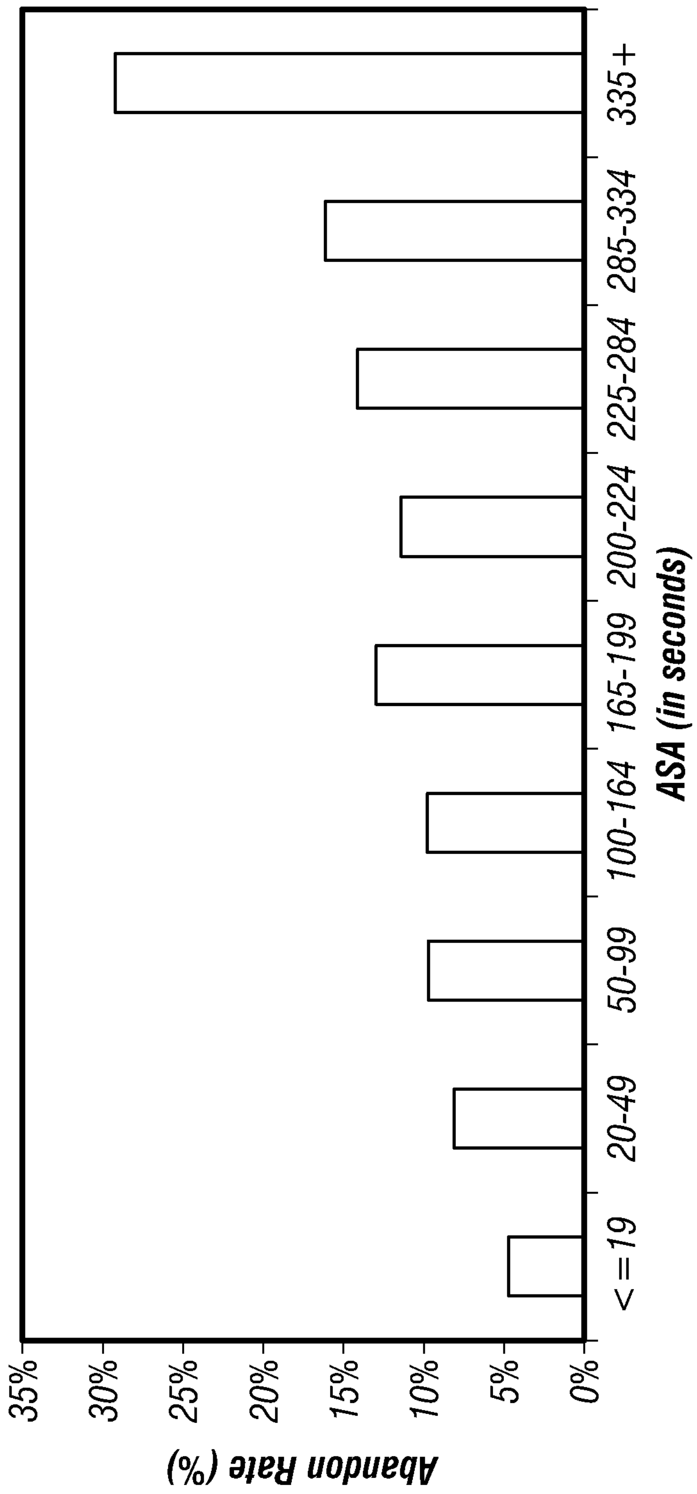
FIG. 3 is a graph showing the relationship between the average speed of answer (ASA) of calls at a call center to the abandon rate, according to an embodiment.

An embodiment can be understood with reference to FIG. 3. FIG. 3 is a graph showing the relationship between the average speed of answer (ASA) of calls at a call center to the abandon rate, i.e. the dropping of the call. For example, based on the data in FIG. 3, it can be estimated that if a particular call center agent was able to answer a call in less than ninety seconds, the abandon rate for that call is about 10 percent. If the call center takes about 335 seconds to answer a call, then the abandon rate for such call is about 30 percent.

Thus, in an embodiment, it is desirable to estimate or compute the wait time for a given call. That is, based on the arrival rate, the wait times can be estimated as discussed in further detail hereinbelow, in the section entitled, WAIT TIME AND QUEUE CHOICES: PREDICTING CUSTOMER CHOICES. For example, once a distribution of wait times is established or generated, a potential population that is presently waiting on a call or voice channel can be estimated. As well, an embodiment provides a technique for determining what messages to play and the consumer behavior when different types of messages are played or when different information is provided to the customer.

Chat Volume Estimation Based on Customer Call Data

Two Ways: Call Deflection and Web Containment

In an embodiment, a technique is provided for people on the phone when a message is played that has the effect of moving such people over to another channel, such as the Web, for obtaining assistance such as chat, i.e. call deflect. As well, a technique is provided for those individuals who are already on the Web to stay on the Web to get their answer, i.e. Web containment. That is, it is desirable to keep those persons who are already on the Web from getting frustrated and changing over to the call channel, which is discussed in further detail hereinbelow.

Two Populations for Call Deflection

In an embodiment, two particular types of populations to address for ensuring they are served quickly are those that abandoned calls and those who waited a long time for assistance or an answer. Both of these populations need to be served: a company wants to serve those people who might abandon a call, and as importantly, a company would want to serve people who waited a long time as well, because they may have had a poor customer experience. In essence, the company does not want customers to wait a long time in any of the channels to be served.

As well, persons who waited a long time may not have known or realized that other options for obtaining answers or assistance existed, such as through a chat channel or through self service on a related dedicated Web page or site. From a company's perspective, it might be beneficial to address some fraction of customers' issues through chat or Web self service and, thus, to make customers aware of the choice to come to a chat channel or at least to the company's website for self service or assisted self service.

Thus, an embodiment identifies at least two types of populations to direct or drive to the chat channel or web. In doing so, not only are such customers served more quickly and thus have a better experience, but it has been found that providing service via the chat channel or Web may be less costly than providing service via the voice channel, as described in further detail hereinbelow.

An example implementation of chat volume estimation can be understood with reference to FIG. 4. FIG. 4 shows data about chat volume estimation based on actual anonymous data from 247 Customer, Campbell, Calif., according to an embodiment. On the upper left hand side, FIG. 4 shows a table of the Deflection Potential Population from Abandoned Calls 402, which population has been shown to result in a 20 percent acceptance rate for accepting the offer to move over to the chat channel. The columns represent, respectively, Average Speed of Answer in seconds, Total number of Calls during the range of seconds, the percentage of the population within the range of seconds who abandoned their calls, the percentage of such population within the range of seconds who are a potential chat population, the hot lead percentage (defined and described in further detail herein), and the total number of chats accepted. For example, referring to the first row, for the ASA less than 19 seconds, 12011 calls fall into that range. For such calls, 4.6 percent were abandoned. As well, no hot leads are determined and there are zero chat sessions. It should be appreciated that the last row indicates 347,311 total number of calls, 43,306 hot leads and 8661 total chat sessions. Thus, such data from FIG. 4 illustrates how, according to an embodiment, there is a threshold wait time above which deflection to chat actually makes sense. Below this threshold it does not make as much sense to deflect chat because the time it takes to move to the chat channel may not be worthwhile as such people would likely be served faster via voice.

Similarly, the right hand side of FIG. 4 shows a table for Deflection Potential from Long Wait Times 404, which population has been shown to result in a five percent acceptance rate for accepting the offer to move over to the chat channel. The columns are the same as in table 402. The data in the first three columns are the same as in table 402. However, the potential of such population for chat is different. For example, for the row where the average speed to answer is 50-99 seconds, the potential for chat from this population of callers is 40 percent. As well, the number of hot leads is 5670. The total number of chats is 283.

The table at the lower left hand side of FIG. 4 shows Chat Volume Estimation 406 that can be derived from tables 402 and 404 together. For example, the first row shows that the total number of chats taken is 8661 plus 12,910, which equals 21,571. It should be appreciated that table 406 shows that chats can be taken concurrently. For example, table 406 shows that the concurrent chats are 1.5, which means that, on average, an agent can chat with 1.5 people at the same time.

It should further be appreciated that given the other data shown in table 406, the number of agents needed in this example to handle the number of chats in a given day is 21.

Optimization of Deflection—Levers Likely to Impact Call Deflection

In an embodiment, a technique is provided for optimizing the solution of causing call deflection. An embodiment contemplates building a design of experiments approach where key variables are determined. A design of experiments approach to understanding key levers helps increase deflection and manage chat volume. That is, an application of a structured design of experiments approach helps drive the right volume of traffic from voice to chat, according to an embodiment. For the purposes of discussion herein, design of experiments is an accepted terminology used by statisticians and is well-known to a person skilled in the art.

In an embodiment, some variables likely to impact the success of the call deflection strategy may include:

- IVR message;
- Length and content of the chat URL announced on the IVR;
- Chat invite/pre-chat form design;
- Ability to measure and forecast chat volumes through:
  - Proactive chat,
  - Button chat, and
  - Call deflection; and
- Build useful buffer It should be appreciated that for the purposes of discussion herein, button chat refers to a technique by which a user selects a selector, e.g. a hyperlink or a button selector, on a Web page to connect to a chat agent. For example, consider a visitor who goes to a customer service page in the website and sees a hyperlink in the page which says, for example, "Would you like to chat with our customer service representative?" When the visitor clicks on such hyperlink, the visitor is connected to a chat agent. This technique is as opposed to another technique in an embodiment, herein referred to as a proactive chat, where the visitor's browser is proactively invited by the system because the visitor displays a particular Web behavior.

Further details about such variables are described as follows.

An Example Key Variable: IVR message: What Messages are played and When

An embodiment provides techniques for maximizing the conversion from voice to chat or from voice to the Web by optimizing particular parameters. An embodiment determines and provides optimal IVR messages as one or more variables from the design of experiments approach. For example, a parameter may be that within the IVR, a particular message about chat or the Web is to be played. Another parameter may be what particular message is played first. It should be appreciated that such parameters are by way of example only and are not meant to be limiting. Different messages may cause different responses. For example, a message saying, "Okay, why don't you just go to chat and the resolution will be solved immediately?" may invoke a different response than from another message saying, "If you move to chat, the wait time is less," or, "If you go to chat, you'll receive $100." Thus, the type of message played on the IVR may have a different impact on the conversion to chat.

An Example Key Variable: Length and Content of the Chat URL Announced on the IVR In an embodiment, an optimal URL is derived and provided to a customer as a variable from the design of experiment approach. Such optimal URL has an optimal length. For example, the length of the optimal URL is not too long that a consumer cannot remember it. Nor is it too long that a consumer might find it annoying to type into the input URL field of the corresponding Web page. An example optimal URL is "www.MerchantnameChat.com". An example non-optimal URL is "www.MerchantnameChat/TextA/TextB/TextC/.com", because the URL is a long string with many forward slashes and more text after each random slash. It should be appreciated that such examples are for illustrative purposes only and are not meant to be limiting.

An embodiment contemplates particular experimentation performed for understanding and determining user behavior as to what drives such optimal URL that drives maximum conversion to the Web from the voice channel.

An Example Key Variable: Intuitive Design: Chat Invite/Pre-Chat Form Design

An embodiment provides determining and providing an optimal intuitive design as a variable from a design of experiment approach. Data is gathered and analyzed by the system for determining once a user arrives at a chat invite Web page, how intuitive is the design of such Web page in view of maximizing conversion to the Web? How inviting is the design for resolution? Attributes of the invite that determine customer behavior may include, but are not limited to: Invite size, Invite content, contextuality of the invite, customization with respect to customer attributes, etc.

An Example Key Variable: Ability to Measure and Forecast Chat Volumes

An embodiment provides determining and providing ability to measure and forecast chat volumes as a variable from the design of experiment approach. Importantly and specifically, an embodiment provides the ability to measure and forecast chat volumes through any of proactive chat, button chat, and call deflection. Regarding proactive chat, according to an embodiment, the system selectively pops up an invite to determine with whom to chat. Put another way, the system determines the target customers with whom to chat. Such determination is driven by the system's predictive models. A chat invite is provided to the targeted customers who can then accept or reject this invite. Regarding button chat, a button to enable chat is provided on the Web page to the customer. In button chat, all customers coming to a particular Web page are provided a selector for chat, e.g. a "click to chat" button.

Such variable is important because it causes people to move, i.e. move to the Web with a promise that they will be served immediately.

The system has no control over who comes to the Web page. The invitation is an open-ended invitation. For example, in a typical scenario, it would not be likely that only ten people, for instance, are invited such that the system can indicate that only one agent is required who can serve exactly ten people. As well, the system does not know that exactly that 10,000 people will accept this offer. For example, if the system computed that exactly 10,000 people would accept this offer, then, an enterprise may use ten agents, and so on.

Thus, an embodiment provides a forecasting simulation solution to the problem of an enterprise being able to staff appropriately in the associated chat channel based on how many people travel through the above described IVR journey, accept the chat invite, and end up in chat.

According to an embodiment, some key concepts regarding a plan for staffing include, but are not limited to:

- Application of statistical models to identify distributions for call arrival, call wait time and call abandon time. Then using this distribution to determine when to play the message during a customer's wait time.
- Design of experiments to understand the behavior of customers during the wait time.
- Customer profiling to understand how the various customer attributes, such as but not limited to, customer history of issues, demographics, and geography affect the customer behavior when a message is played. This in turn is used to determine when and/or what message is played for a given customer during their wait.
- Exploiting the buffer capacity provided by proactive chat for Web containment. Buffer capacity is described in further detail hereinbelow.

Put another way, an embodiment maximizes ensuring that when the system deflects a visitor from waiting in the voice queue to chat, the system is not making him/her wait in the chat queue again. Thus, the techniques described above are used to avoid this situation.

An Example Key Variable: Build Buffer

An embodiment provides determining and providing a buffer as a variable from the design of experiment approach. Such buffer can be understood by way of example. For example, the system may provide proactive chat for people who are already on the Web. Proactive chat is defined herein as a chat session, the invitation to which is controlled by the system. Proactive chat is triggered by the system. Assume in a particular scenario that, at the same time, the system could be providing chat for the people who are coming through the IVR deflection. Thus, for example, assume the enterprise provides 100 agents and twenty of the agents are staffed for proactive chat and the other eighty are staffed for IVR deflection. If the traffic for people staffed for IVR deflection is more than can be handled by the 80 agents, e.g. the system determines that 90 agents are required to handle the traffic. Then because the system is providing agents for proactive chat, such agents may be considered a buffer. In an embodiment, the system may shut down the chat invite for proactive chat for the 10 agents and then repurpose these additional 10 agents to IVR deflection.

The buffer can be used in the opposite scenario, as well. For example, when the system detects limited traffic from IVR deflection, then the system may cause additional agents assigned to IVR deflection chat, instead, to start proactive chat. The reassigned agents to proactive chat may create more conversation, as well. Then, when the traffic from the IVR deflection goes up, the system can shut off the added proactive chat session.

Thus, the system provides a buffer to manage traffic, even when the forecasted number of required agents may be temporarily incorrect.

Potential Chat Opportunity

Figure 5:
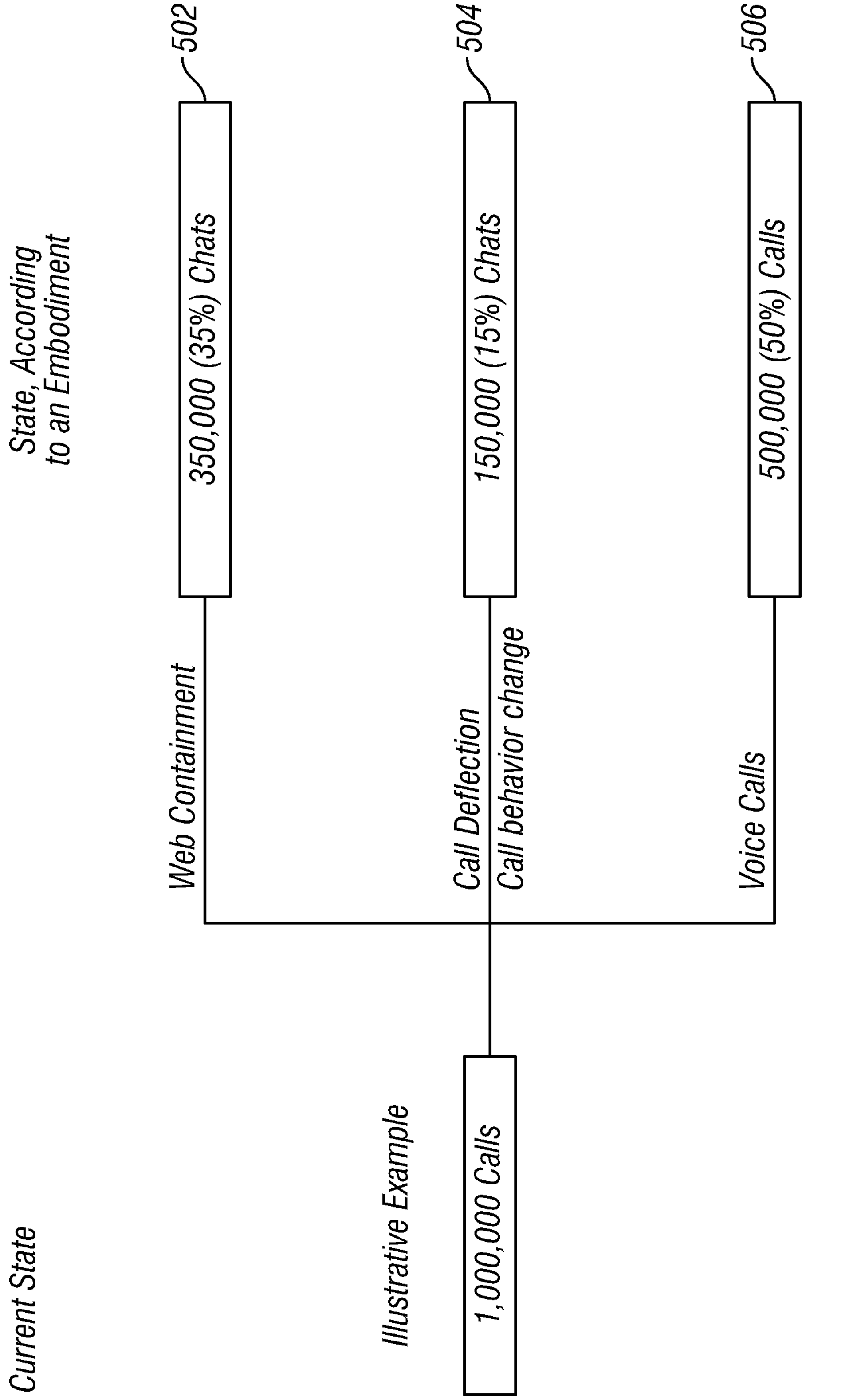
FIG. 5 is a schematic diagram comparing the current state of addressing customer needs on the voice channel with the state according to an embodiment.

An embodiment of potential chat opportunity can be understood with reference to FIG. 5. FIG. 5 is a schematic diagram comparing the current state of addressing customer needs on the voice channel with the state according to an embodiment. According to the current state, a prior art state, one million calls, for example, coming into a call center are handled through the call channel.

In an embodiment, however, some of the one million calls may be handled through Web containment. That is, this prong represents people who would previously have come to the Web, been unable to find an answer, and then went to the call channel, i.e. placed a phone call for help. In an embodiment, such people are contained over the Web. Referring to the illustrative example in FIG. 5, out of the one million calls, 350,000 of the calls, or 35%, were contained on the Web 502.

In an embodiment, some of the one million calls are call deflected. That is, the system causes call behavior change by moving the callers from the call channel to the Web channel or chat. As described herein, an example implementation is playing a message over the IVR to the caller that offers an incentive to the caller to go to dedicated Web chat page and that also recites a simple-to-remember URL for the caller. It should be appreciated that other techniques for causing the caller to move to the chat channel are contemplated and are within the scope of the invention. Further, it should be appreciated that users may be call deflected to other channels besides chat, such as self-service or assisted self-service. Referring to the illustrative example in FIG. 5, out of the one million calls, 150,000 of the calls, or 15%, were call deflected 504.

As well, FIG. 5 shows that some callers remain on the call channel. Referring to the illustrative example in FIG. 5, out of the one million calls, 500,000 of the calls, or 50%, remain on the voice channel 506.

Analysis Methodology for Web Containment

Figure 6:
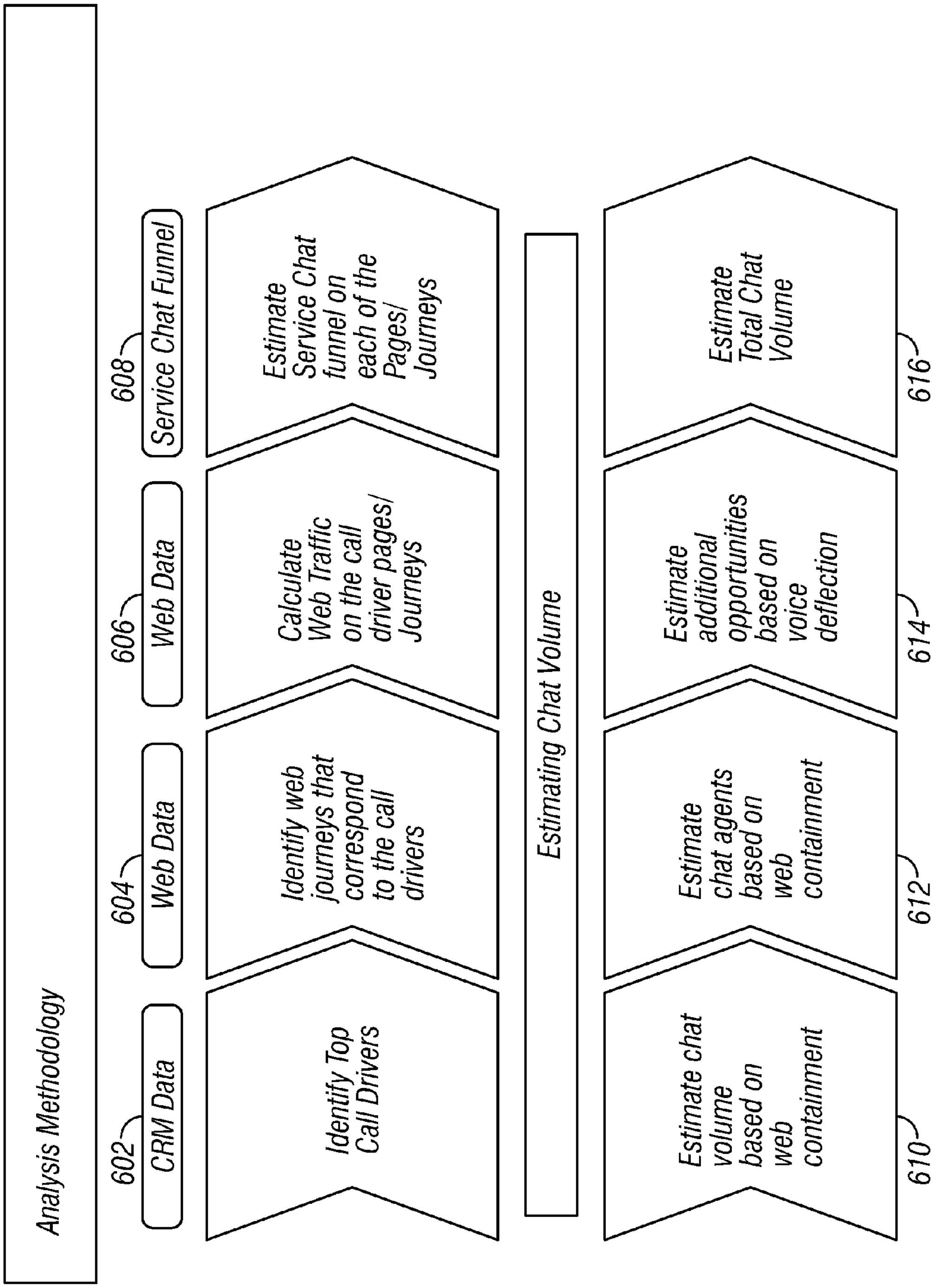
FIG. 6 is a flow diagram for Web containment according to an embodiment.

An embodiment for Web containment can be understood with reference to FIG. 6. FIG. 6 is a flow diagram for Web containment according to an embodiment. Web containment refers to people who are already on the Web. It is desirable to answer the question: How does one contain these people on the Web? One embodiment includes beginning with gathering call data, such as customer relationship management data (CRM) 602. For the purposes of discussion herein, CRM refers to transaction data related to the call, such as but not limited to call time, date, total call handle time, agent who took the call, call issue type handled, attributes of the customer who called, attributes of the agent who took the call, attributes of prior history of interactions of the customer, etc. In particular, an embodiment identifies top call drivers. For the purposes of discussion herein, call drivers are issues customers face that drive call volumes. A top call driver is the issue that drives the most calls. For example, issues with the telephone bill may be the primary call driver for a telephone company call center. One example top call driver may be activation of a particular software product. Suppose requests for activating a particular software application make up 25 percent of the calls. What this means is that many people are actually coming to the Web to activate the software or to obtain help for activating the software, but are unable to solve the problem and switch over to the voice channel. It is desirable to contain such people on the Web. Further details about identifying key call drivers is described hereinbelow.

Further, one embodiment includes identifying Web journeys that correspond to each particular call driver 604. For the purposes of the discussion herein, Web journey corresponds to the various footprints on the website left by any website visitor. These include but are not limited to the visitor's referral page, landing page, clickstream of page he/she visited, wait time in each of these pages, number of pages visited, exit page, etc.

Once the unique Web journeys for each call driver are identified, the embodiment computes the Web traffic on the call driver pages and on the pages of the corresponding journeys 606. Web traffic here refers to the complete distribution of visitors at the page and a distribution of how long visitors spend on the page.

Thus, an embodiment uses the gathered Web analytic data and Web traffic data to understand visitor behavior on these call driver-related pages.

For example, at this stage, an embodiment can compute that for a given number of visitors for a particular vertical, if X percentage of these are invited to chat and Y percent are served, then Z percent actually end up chatting. Thus, based on the above, an embodiment estimates the service chat volume 610. Further details about identifying call volumes are described hereinbelow.

Once the estimation of chat volume is computed, then the number of agents that are required based on Web containment is also computed 612.

Further, an estimation of additional chat opportunities based on call deflection can be computed 614.

Thus, with a computed estimate of total chat volume 616, an enterprise may staff its workforce accordingly.

Identifying Call Volumes and Key Call Drivers

Figure 7:
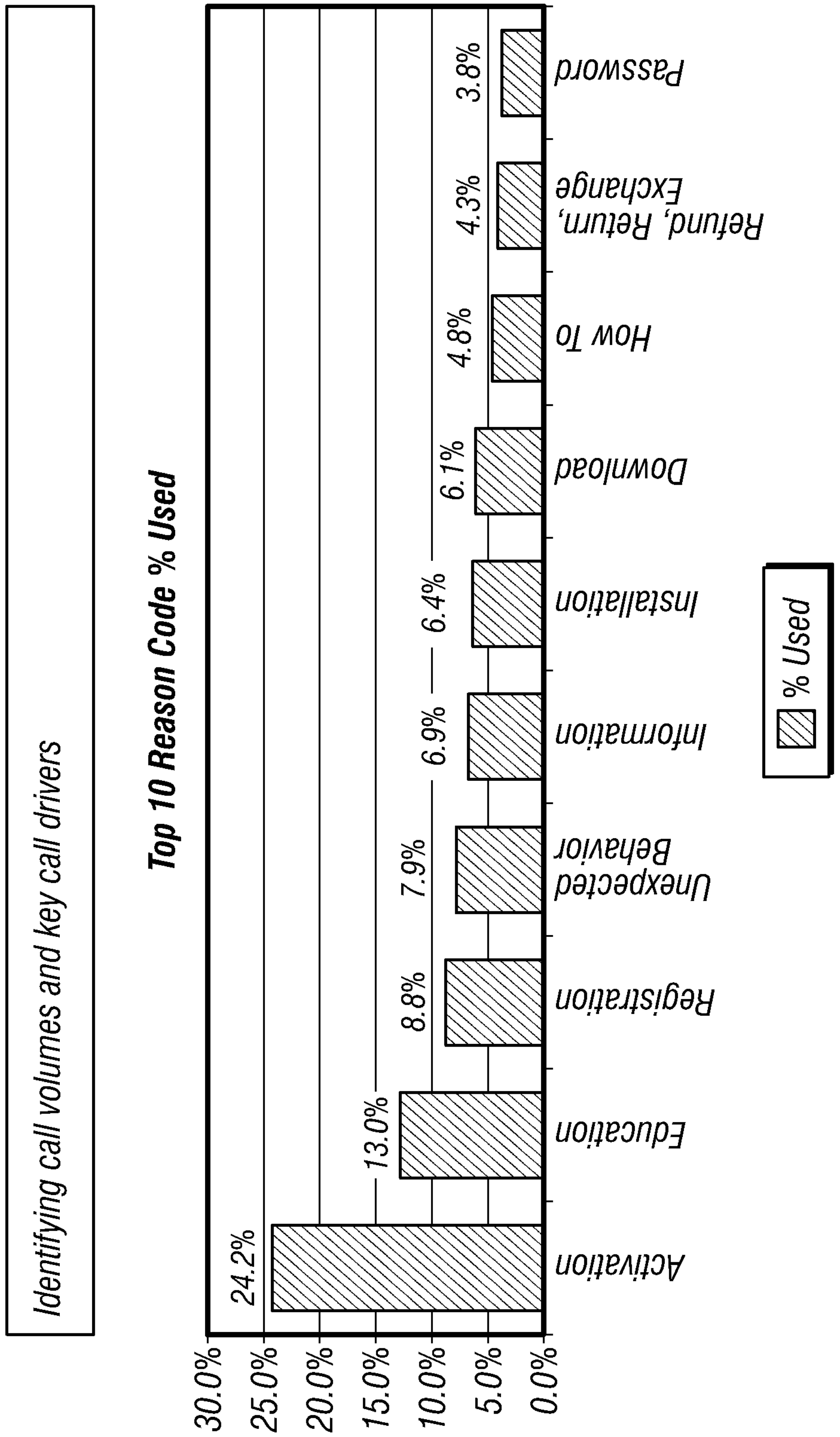
FIG. 7 is a chart of call types versus a percentage of callers who correspond to the particular call type, according to an embodiment.

An embodiment for identifying call volumes and key call drivers can be understood with reference to FIG. 7. FIG. 7 is a chart of call types versus a percentage of callers who correspond to the particular call type. Examples of call types are activation, education, registration, unexpected behavior, information, installation, download, How To, any of: Refund, Return and Exchange, and Password. Such call types are meant to be illustrative only and not limiting. For example, 24.2% of the total call volume was identified as calling for activation of some entity, such as activation of software. It should be appreciated that this data arrives from the CRM system as described hereinabove.

Thus, continuing with the example, the system can focus on the biggest call driver, activation, and systematically attack activation for Web containment through a variety of methodologies.

Thus, for example, before, when a user received shipped software, the user had to call a customer number to activate the software, now the user can be instructed to activate his software through a Web page or dedicated URL.

For example, according to an embodiment, the system can capture the user while the user is on the Web in order to activate his or her software right then and there.

Thus, in an embodiment the purpose of Web containment is that once someone is present on the website of a company, the system should provide the individual with the ability to resolve their issues right then and there wherever possible. For example, if a customer buys software on the Web and downloads the software, in an embodiment, the customer does not have to then call a call center to get the software activated, especially in view of the fact that the system may detect when the customer was on the Web to purchase and download the software.

Deriving the Service Chat Funnel from Web Analytics Data

An embodiment for deriving one or more service chat funnels from Web analytic data can be understood with reference to FIG. 8. FIG. 8 is a chart of visits for a particular month, the average number of visitors per month, the category, the level, the hot lead rate, and the number of chats per each particular URL.

The embodiment can be further understood by the following flow:

- First the voice call drivers are well understood based and determined in part on the CRM data as shown in FIG. 7. Based on the major volume drivers and their amenability for resolution over the web, certain call types (issue types) are targeted for Web containment.
- Next, Web analytics and/or weblog data are used to understand in detail customer journeys related to those issue types. This is done in various steps, as follows:
  - First URLS related to these customer journeys are identified, which may roughly translate to the page category. For example, if the system is first trying to target calls related to software activation, then the pages in the activation category (or pages that contain information about activation) are targeted.
  - For the purposes of discussion herein, hot lead rate is defined as the percent of people the system targets for service chat in a given URL. For example, someone in a support page is more likely to be a candidate for customer service chat than someone in the home page. This means that the hot lead rate would be higher in the support page than on home page. In another embodiment, the hot lead rate is a function of the URL but it is also a function of many other attributes such as, customer attributes if available (i.e. in the case of authenticated customers), behavioral attributes on the website itself (e.g. Time on page, hover, clicks, etc.), website journey attributes including clickstream, pages viewed, referral page, landing page, exit page, etc.
  - Then, based on the level of the page (for example, the home page of a website is at Level 1, which may depend on the typically browsing/clickstream hierarchy) and on the other attributes described above, the hot lead rate is determined.

Thus, for example, as shown in the chart, the system determines and presents URLs that are related to each category, e.g. activation customer support where there are issues related to activation, and can then determine the population for that particular URL. Then, based on that determination, the system can build a chat funnel for facilitating a particular number of chats in each one of these pages.

It should be appreciated that the view shown in the chart may be considered an aggregated simplistic one. The number of chats coming from a given URL is not just a function of the URL itself but of several other attributes including but not limited to every attribute derived from the weblog, such as search word typed, referral page, landing page, clickstream, hover stream, page views, times on page, past visits, cross-session behavior, etc., and customer or CRM attributes or data such as customer geo-demographics, and customer history of transactions (e.g. products purchased from the company, past visit, etc.).

Based on Voice Call Distribution and Web Containment

An embodiment for voice call distribution and Web containment can be understood with reference to FIG. 9. FIG. 9 shows a top chart of data related to chat acceptance for each category and a bottom chart of the derived number of agents.

Hot lead rates depend on the level of the pages of the website. For example, the level of a particular Web may be based on how long a person is on the Web page. For example, if somebody is on a page about activation, maybe they're not really looking for answers to something they don't know. Perhaps they are trying to figure out some quick answer. Whereas, if someone else is in trouble in a specific knowledge base related to activation, then that may mean that there is a clear need for help and a clear opportunity to provide help.

For another example, if a Web page is a top-level page, then it may have a lower level, such as 2, for example. If the Web page is more detailed, then it may have a higher level, such as 4, for example.

It should be appreciated that herein a couple of examples of attributes that may determine the hot lead rate have been pointed out. In another embodiment, determining hot lead rate may be a function of a sophisticated multivariate model which would use established statistical modeling and/or data mining techniques such as logistic regression, other Bayesian techniques, or optimization techniques, etc. An example of such a statistical model is found in FIG. 20, a logistic regression model.

In an embodiment, a model that establishes a propensity/probability for acceptance of chat which in turn signals the need for chat for a customer of a particular profile is computed. The resulting score is then used to create a threshold for hot lead rate based on the back-end staffing. The model would also be constrained by the differential in cost structure across the various channels, i.e. voice call, chat, and self-service. For example, a high probability for acceptance may result in a high threshold hot lead rate which in turn would be constrained based on available staffing. In addition, another dimension may be the probable action of the customer if chat were not available. If this probable action is voice call then the system would like to provide chat for the customer. If the probable action is self-service then the system would not chat with such customer. Determining probable action is also computed in the same fashion described for computing chat acceptance rate.

Thus, based on such factors, such as level, the system computes a hot lead rate, using the computer-implemented statistical algorithms. After the hot lead rate is computed, the system can compute an estimate of the number of chats required to service the customers. Then, the system can compute an estimate of the number of agents required by the enterprise to staff its workforce.

Thus, the system provides a mechanism for ensuring that the enterprise captures possible opportunities for causing users, who would have called the customer center after looking at the website and not finding the answer, to remain on the Web in chat, i.e. Web containment.

What is the Additional Opportunity through Behavioral Changes

Figure 10:
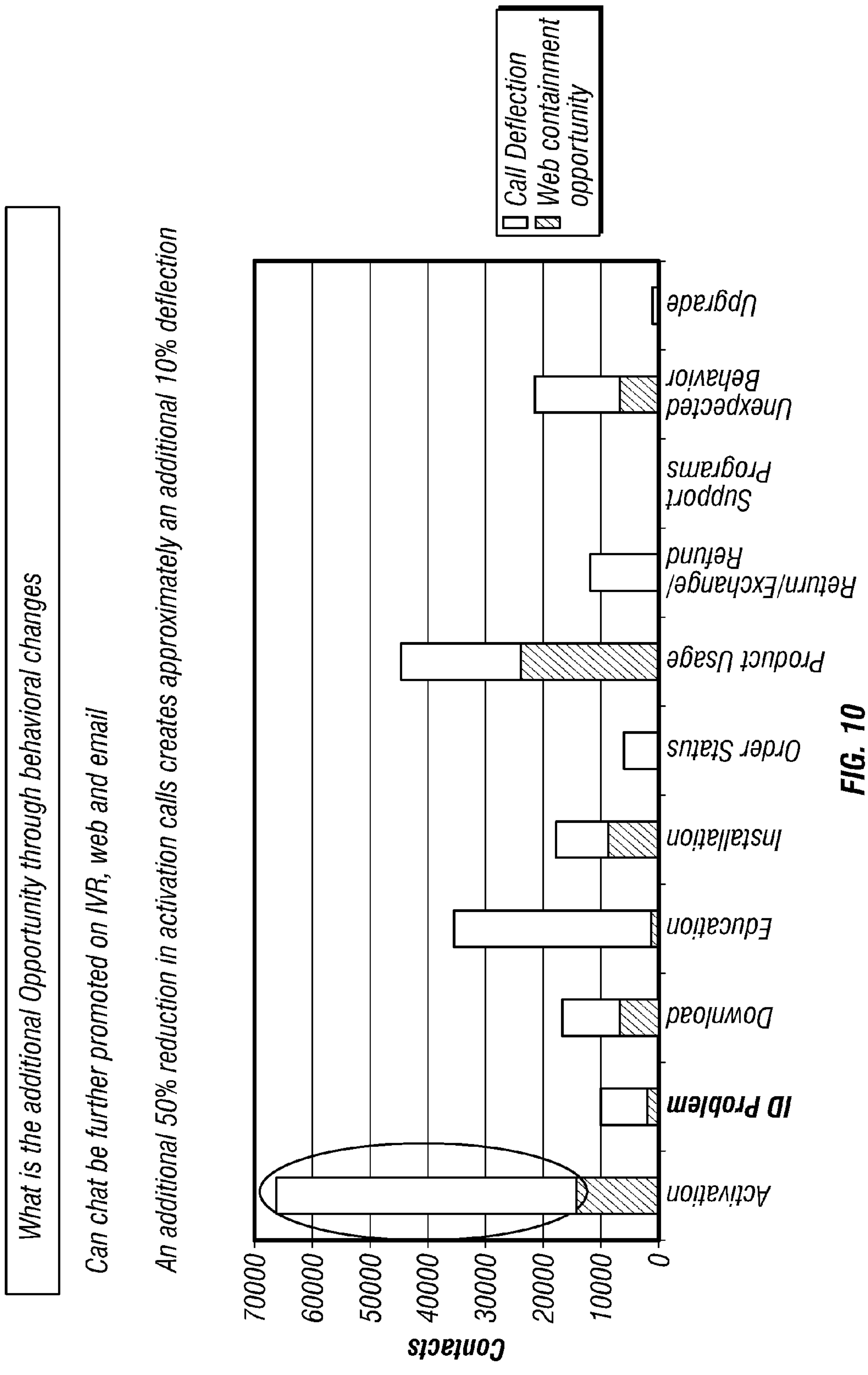
FIG. 10 is a histogram showing the number of contacts, such as through call deflection and Web containment, according to an embodiment.

An embodiment provides determining additional opportunity through behavioral changes, which can be understood with reference to FIG. 10. FIG. 10 is a histogram showing the number of contacts, such as through call deflection and Web containment. The derived data reflected in this histogram answers the question: What is the additional opportunity through behavioral change? As described above, such behavioral change is through call deflection. More particularly, for example, this chart shows that an additional 50% reduction in activation calls creates approximately 10% additional deflection. This data was basically derived from the fact that activation forms about 25% of all calls. The system reduces about 50% of the remaining calls not addressed by Web containment.

The Business Model

FIG. 11 is a table reflecting an example business model, according to an embodiment. Such business model can determine how many calls will be contained over the Web and what the incremental cost-savings are when a user chats versus calls. Based on such determined data, the business model can determine the yearly cost-savings for an enterprise. Related to that is the yearly revenue.

Web Behavior and Levers for Rules Manager

In an embodiment, the system determines an estimate at the macro level of how many people would like to chat with an enterprise or organization. From the macro level estimate, the system determines how to execute Web containment by creating rules for causing the initiating of chat. That is, the system helps builds rules for determining how to staff for proactive chat. An embodiment builds the rules to determine with whom an agent should chat. That is, the system answers the question: Who do you chat with?

Time on Page (TOP) Distribution

Figure 12:
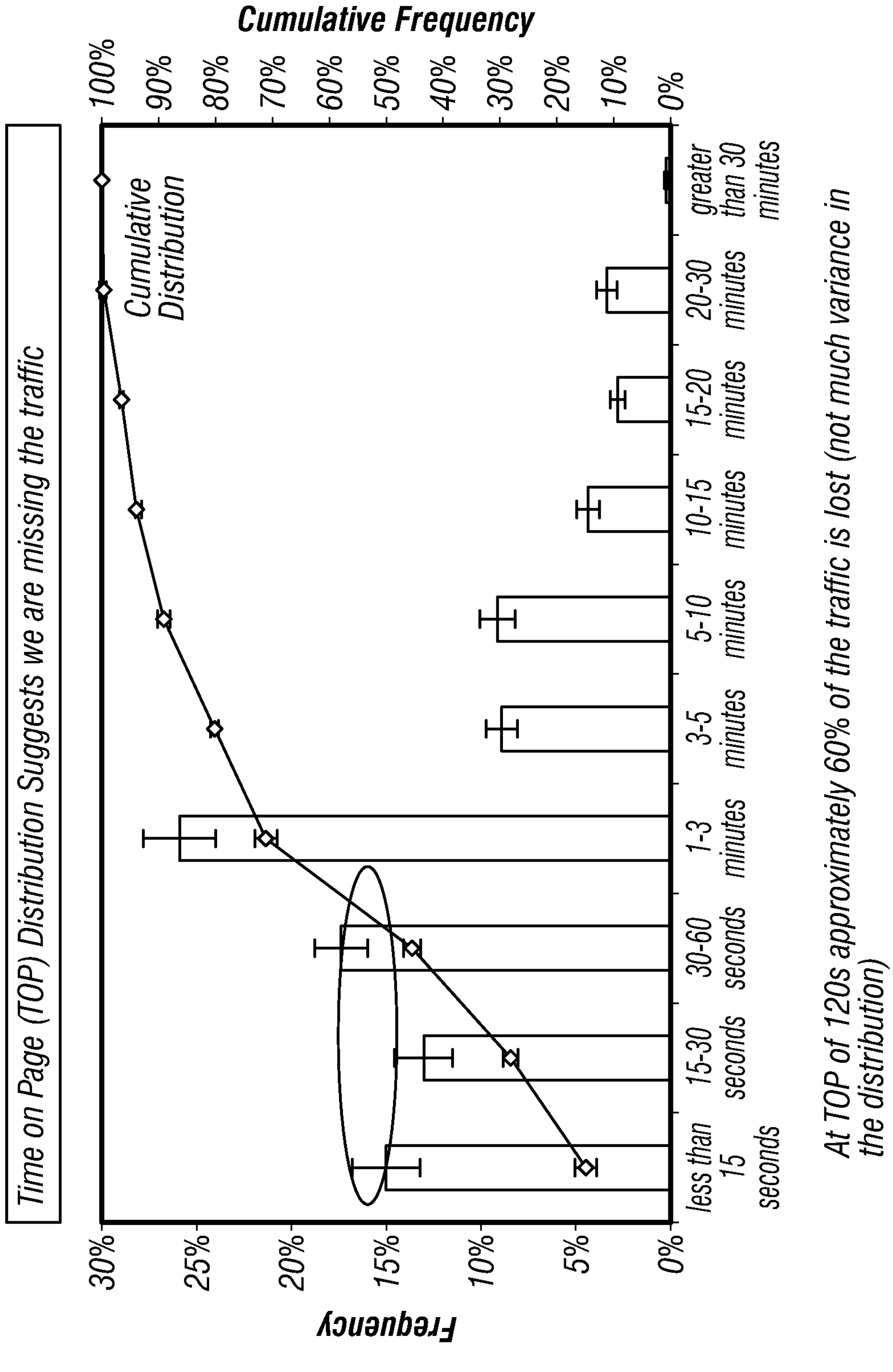
FIG. 12 is a histogram showing the frequency versus number of seconds for time on page (TOP) distribution, according to an embodiment.

An embodiment provides a time on page (TOP) distribution. This distribution is used to estimate that when the system proactively invites a customer to chat at a certain point of time, the percentage of people the system may end up addressing. This distribution combined with acceptance rate modeling determines the volume of people that end up chatting from that particular page. An embodiment computing and using a TOP distribution can be understood with reference to FIG. 12. FIG. 12 is a histogram showing the frequency distribution of visitors that fall into that time bucket versus number of seconds. For example, at TOP of 120 seconds, approximately 60% of the traffic is lost. Further, it should be appreciated that not much variance in the distribution is shown for the time after 120 seconds.

In an embodiment, a TOP distribution is provided. Such distribution shows how people behave on different pages. Based on the TOP distribution, the system can determine when to intervene in order not to lose the customer on the Web page. That is, the system can facilitate determining when to intervene to capture a significant chunk of the population for any intervention mechanism. In an embodiment, this step is implemented using a "Time on Page" rule. For example, in a certain URL the proactive chat will pop up after "x' seconds which is determined by the fraction of the population still on the page after x seconds and other attributes such as predicted acceptance rate, etc.

Again it should be appreciated that the time-based rule does not have to be purely based on a URL. It can be truly multivariate and can be a function of the entire Web journey thus far, landing page, referral page, number of page views, exit, click/hover on hyperlinks, etc. The URL based time on page is one example.

Acceptance Rates

An embodiment provides techniques that compute and use the acceptance rate. The acceptance rate is the probability that a given population/profile accept to engage in a chat session at a particular time. Acceptance rates have been found to be important, because acceptance rate may be considered the best proxy for who actually wants to chat with an agent. That is, because the embodiment is typically provided in the customer service industry, there is no point chatting with people who are capable of and may desire to solve their problem through self-service.

Thus, an embodiment provides a solution to a complex optimization. On the one hand, it is assumed that a customer does not want to wait too long to obtain an answer, as demonstrated in FIG. 12. Recall in FIG. 12, when customers had to wait too long, they abandoned the Web page. At the same time, it is assumed that an enterprise shouldn't be too quick in chat, because people may get irritated because they may have wanted to solve the problem themselves and interrupting them may be annoying. Thus, an embodiment provides a mechanism for determining an optimum level. Overall, the optimization problem being solved could be any one of the following, depending on the specific needs of a particular company:

- The objective can be to minimize cost. In this case, the goal would be to be very conservative in inviting for chat. This goal would require the threshold probability that there would be a voice call if the issue is not resolved on the Web to be high. As well, the probability that the issue be resolved through self-service is very low.
- The objective can be to maximize Customer satisfaction while constraining costs below a certain threshold. In this situation, one would be more liberal in cannibalizing some amount of self-service with chat, i.e. the threshold probability that the issue will be resolved through self-service could be higher.

Figure 13:
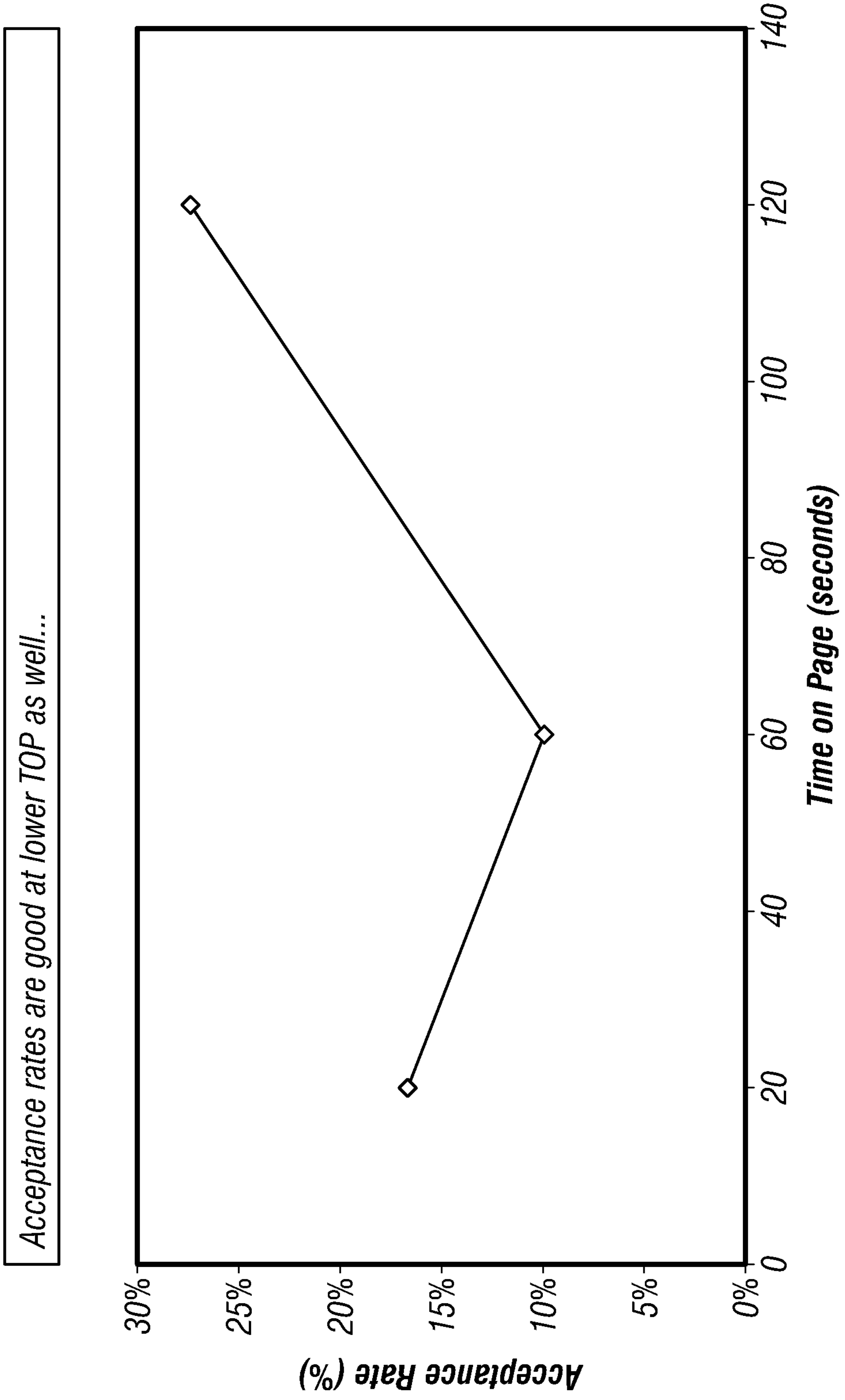
FIG. 13 is a graph showing the acceptance of chat rate versus Time on Page (TOP) in seconds, according to an embodiment.

An embodiment maximizing the number of people who need help and minimizing the number of people who do not need help can be understood with reference to FIG. 13. FIG. 13 is a graph showing the acceptance of chat rate versus TOP in seconds. For example, at 20 seconds, the chat acceptance rate around 17%, whereas at 60 seconds, the chat acceptance rate is lower, at around 10%. As well, the chat acceptance rate is above 25% at about 120 seconds. These rates suggest that it may be good to intervene with some sort of invitation to chat earlier on around 20 seconds and later at around 120, but not around 60 seconds. Put another way, in an embodiment, one skilled in the art may assume that acceptance rate above a certain threshold time on the page increases sharply. For example, in the above example, the threshold time is 120 seconds.

Chats and Calls Have Similar Time of Day Distributions

Figure 14:
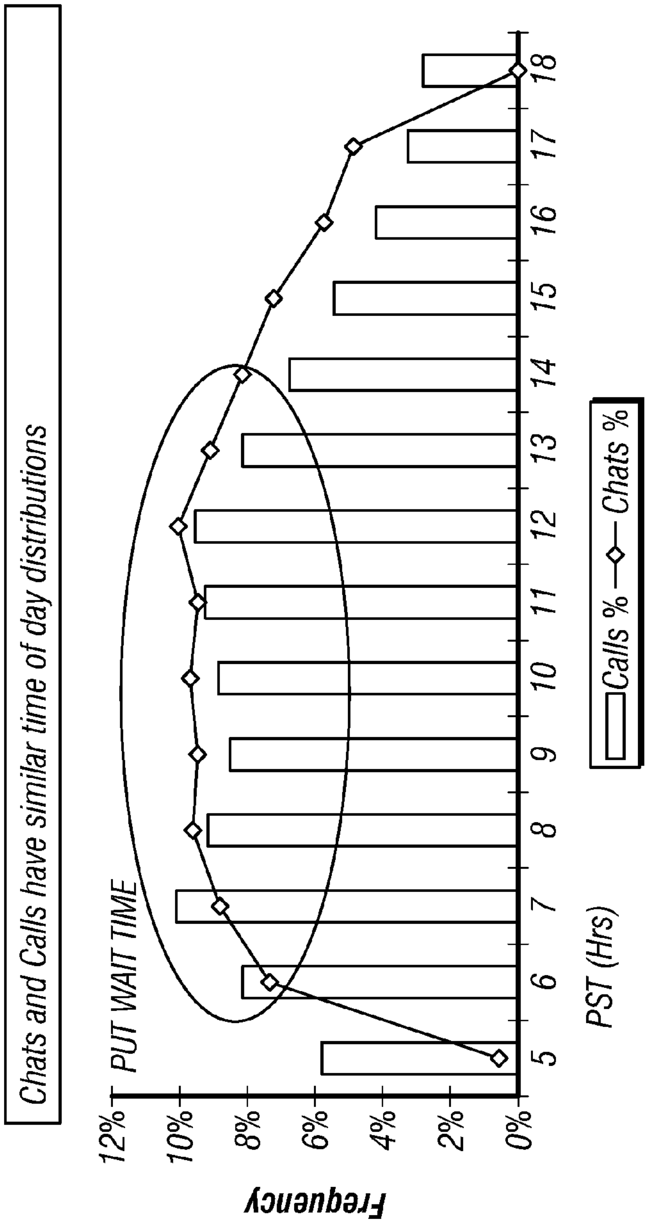
FIG. 14 is a histogram showing TOP distributions for chats and calls and their correlation, according to an embodiment.

According to an embodiment, there has been shown a strong correlation between chat and voice, which means that if people are contained on the chat channel, such people probably will not call. FIG. 14 is a histogram showing TOP distributions for chats and calls and their correlation, according to an embodiment. Referring to FIG. 14, peak-times between 6 hours to 14 hours for visitors and calls have been gathered.

As well, in an embodiment, broad rules management based on time of day may lead to deflection of calls. An embodiment maps the times where the call frequency distribution best correlates (and is high) with chat frequency distribution and uses that mapping as a way to estimate the best times for deflection.

FIG. 14 reflects that in the particular example, 80% positive correlation between call and chat volume distribution has been found. This correlation becomes an attribute to the multivariate model to determine the probability of acceptance.

In an embodiment, segment level chat data and voice data may allow better understanding of the relationships between call and chat potential. For the purposes of discussion herein, segment level refers to any definition of the segment that would be a function of call type, customer segment, and other attributes used for segmentation of customer coming in for service.

Acceptance Rate Goes Up as User Rating Goes Down

Figure 15:
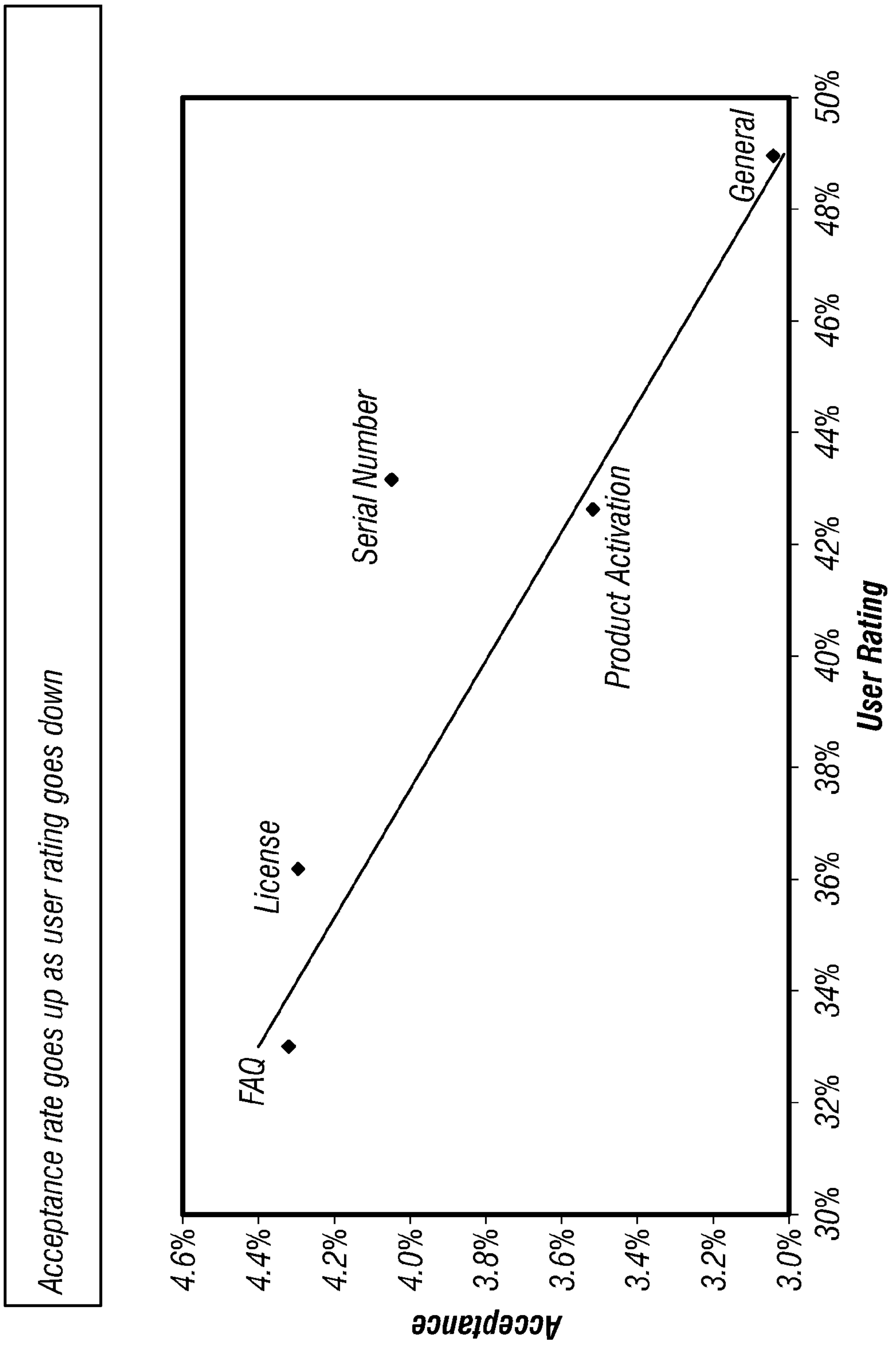
FIG. 15 is a graph of acceptance rate versus user rating, according to an embodiment.

An embodiment using acceptance rate versus user rating can be understood with reference to FIG. 15. FIG. 15 is a graph of acceptance rate versus user rating. According to an embodiment, the system performed an analysis of each website of a particular population of websites and determined that particular attributes of the website and of some Web pages on the website may cause particular consumer behaviors. For example, when a particular website's quality was considered poor, then people wanted to chat more. Within a particular website, on pages which had poor user rating, the acceptance rate for chat was found to be very high. Referring to FIG. 15, for example, the system determined that the category, Product Activation, was given about a 43% user rating and, thus, its chat acceptance rate was relatively low at around 3.6%. FIG. 15 shows that the chat acceptance rate goes up as user rating goes down.

Some examples of key drivers, e.g. Web pages, of calls are as follows. One key driver may be that the website design is not very intuitive. Thus, when people come to that website, they may not find any answers. Another example of a driver is a particular Web page or website lacking in knowledge. Thus, when the knowledge is not readily available or simply not available at all on the website, people call. In the two examples above, the associated websites and Web pages may be given a low user rating. These ratings may be derived from customer survey data administered online or offline. Thus, an embodiment provides techniques for when determining and possibly assigning a low user rating, and then providing mechanisms to drive chat in order to avoid calls.

Entry/Exit and Usability Analysis is Used for Identifying Hot Leads

An embodiment provides determining and computing hot lead Web pages by using a two-by-two grid or table of user rating versus exit rate. For the purposes of discussion herein, exit rate is the percent of customer who exit the website from a given page. Thus, when the exit rate is high and the user rating is low, it may be assumed that the people on those pages have not found what they wanted and are exiting the pages. When the user rating is high and exit rating is high, it may be assumed that the users quickly found what they wanted and left the Web page. In that case, an organization may not want to interrupt those users to determine whether they want to go to chat. When the user rating is low and the exit rate is low, it may be because the page itself is not good, but the users are still moving onto other pages to find their answers. Thus, in an embodiment, the system causes intervention when the user rating is low and the exit rate is high.

Figure 16:
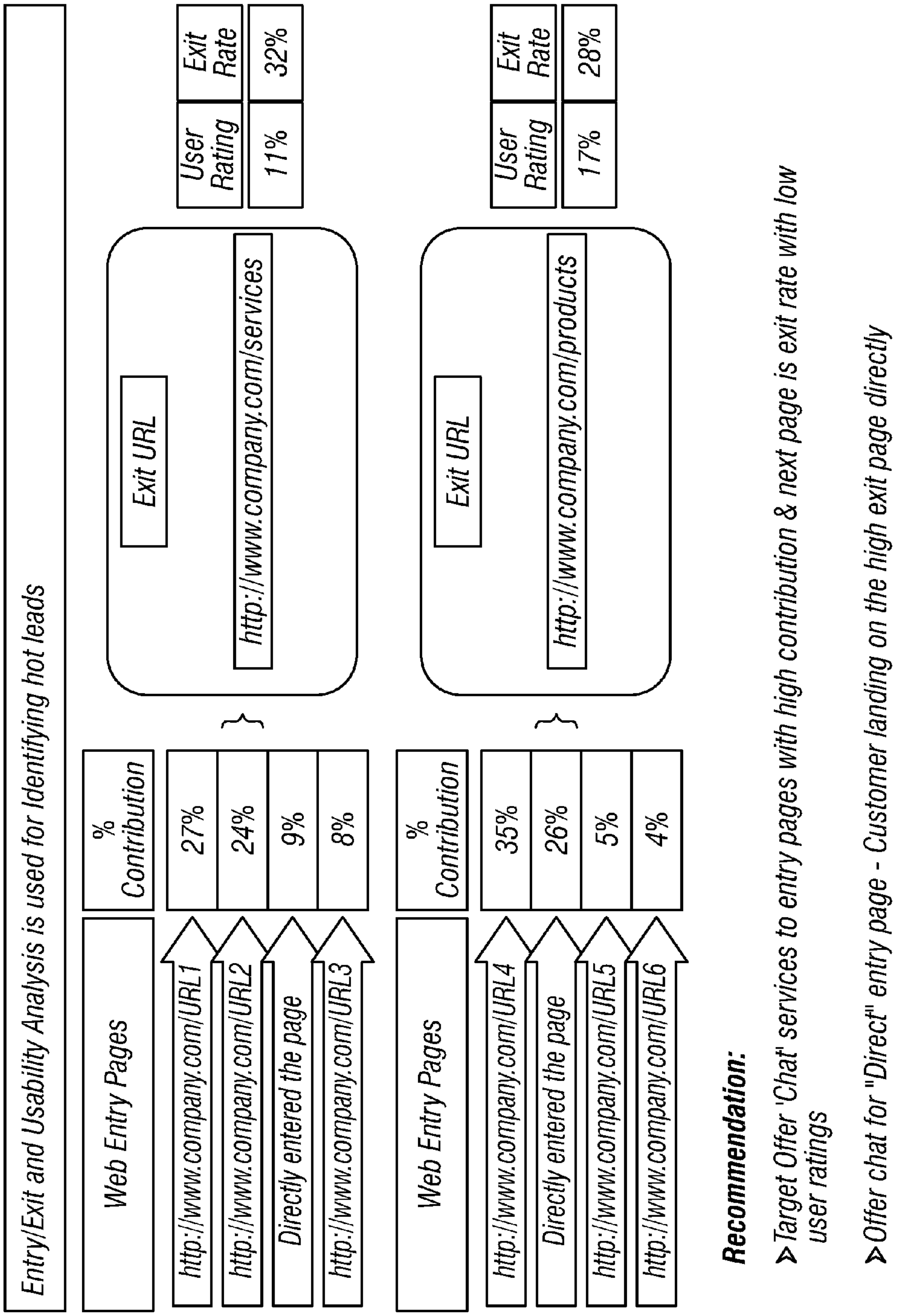
FIG. 16 is a schematic diagram showing how entry/exit and usability analysis can be used for identifying hot leads, according to an embodiment.

FIG. 16 is a schematic diagram showing how entry/exit and usability analysis may be used for identifying hot leads, according to an embodiment. It should be appreciated that the content of FIG. 16 is an instance of the multivariate model described in FIG. 20. Referring to FIG. 16, the two attributes, exit rate and user rating, are used to segment customers. The logic is that for a given URL if the user rating and exit rate are both high then the visitor probably found what he/she wanted from the page and left. However, if exit rate is high and user rating is low then the users probably were not able to self-serve effectively and are prime candidates for chat. It should be appreciated that any number of attributes may be used to create this segmentation, such as for example as shown in FIG. 20. The user rating and exit rate provide an example for illustrative purposes about the concept of segmentation.

As can be observed from FIG. 16, an embodiment targets offers for chat services to those entry pages with high contribution and where the next page has low user ratings. As well, an embodiment offers chat for the directly entered page and which has a high exit rate. It should be appreciated that in an embodiment, high and low depend on the website and customer behavior.

Identifying and Servicing the 'Right' Segments—Example

An embodiment for identifying and servicing optimal segments of URLs by exit rates and user ratings can be understood with reference to FIG. 17. FIG. 17 is a schematic diagram presenting two tables for identifying and servicing optimal segments, according to an embodiment.

The top table or grid is a priority grid for chat solution 1702, i.e. user rating versus exit rate. The segmented categories for both user rating and for exit rate are each: low, medium, and high. It can be observed from table 1702 that where the user rating is low and the exit rate is high, the system should target a lot of users on those URLs. Where the user rating is high and exit rate is low or where the exit rate is high, the system does not cause any particular invitations to chat or any other type of intervention. When the user rating is high, the system does not target those people for chat.

It should be appreciated that the table is a result of a multivariate model where user rating and exit rates are key variables, thus, the impact of these variables on the hot lead rate is illustrated thereto.

Text Mining Can Fine Tune Identification of the 'Right' Pages

An embodiment provides a technique which uses text mining to fine tune the identification of pages to target for chat, e.g. the right pages. An embodiment can be understood with reference to FIG. 18. FIG. 18 is a schematic diagram showing a histogram graph and a table, according to an embodiment.

The top histogram shows example issues, such as deactivation and transfer_license, versus percentage. It should be appreciated that such top histogram reflects another dimension where text mining is used as a feedback loop. That is, some modeling was performed based on issues, Web journey, and customer attributes to determine whom to invite. The system invites some people and ends up chatting with a set of visitors. Thus, the text mining and the categorization shown in this graph is a feedback loop as to the content that the participants of the chat chatted about. Thus, this can feed back into the modeling inputs to be able to better derive the next generation of rules/models/triggers as to whom to invite for chat.

The second table shows the description of each category. For example, the description for the category, deactivation, is "Customer is talking about deactivating the software". Thus, FIG. 18 is an example showing that one of the best feedback for the effectiveness of a chat is looking at what customers are talking about in the chat and the defining issue. In an embodiment, when there are certain pages where customers are not finding issues, the system drives down the chat volume there and the system may drive self-service up. Similarly, there may be pages where customers are finding lots of problems. For those pages, the system may drive chat higher in those pages.

Targeting the Right Individuals

Figure 19:
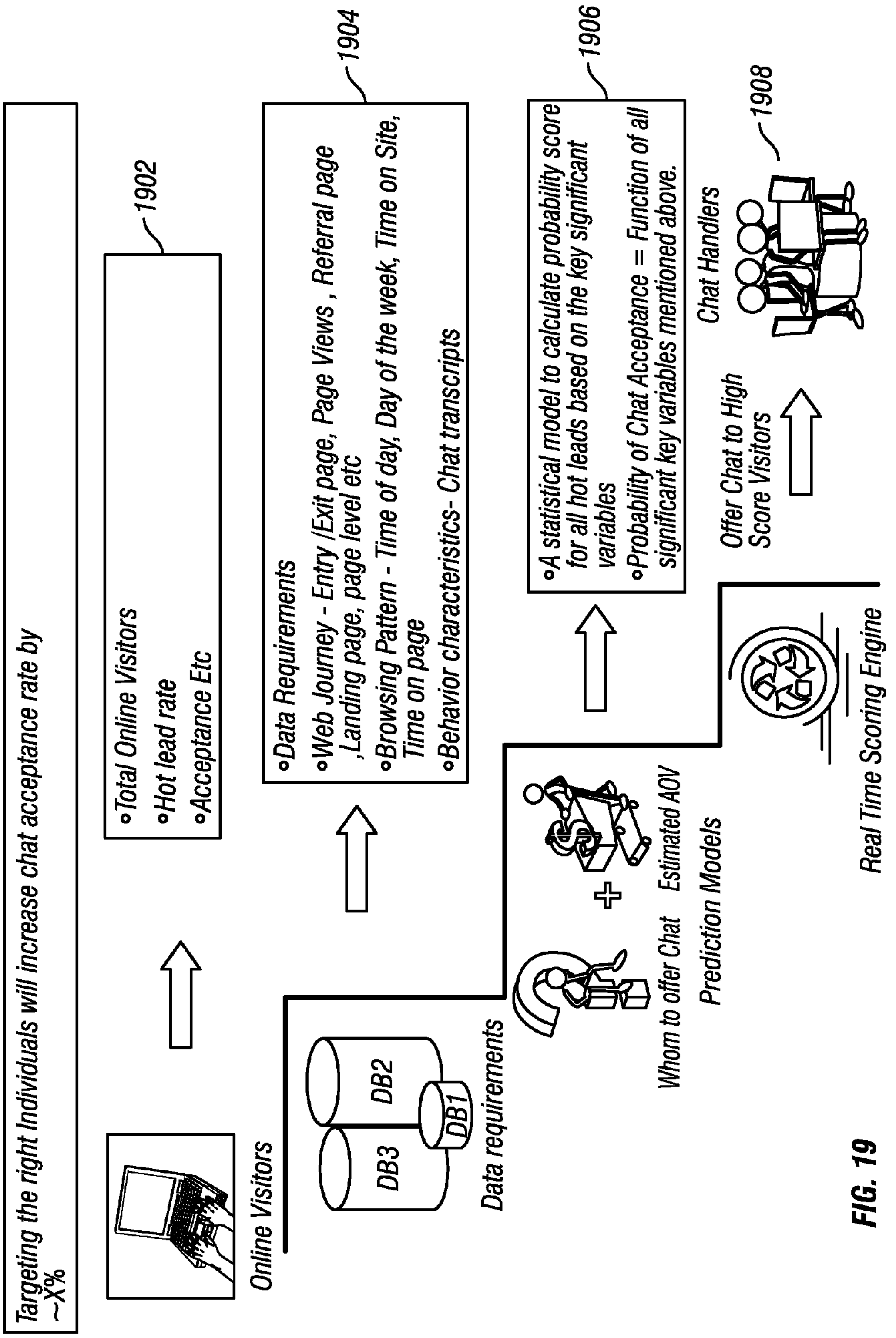
FIG. 19 is a schematic diagram showing a particular computer-implemented process for targeting the right individuals, according to an embodiment.

An embodiment provides techniques for identifying and then targeting the identified individuals, i.e. the "right" individuals, to increase chat acceptance rate by a particular percentage. An embodiment for identifying and targeting such individuals can be understood with reference to FIG. 19. FIG. 19 is a schematic diagram showing a particular computer-implemented process for targeting the right individuals. Data from online visitors are collected and analyzed to generate the following resulting data, which include, but are not limited to: total online visitors, the hot lead rates for Web pages, and the chat acceptance rate for each page 1902.

Further, data requirements are determined. As well, the system gathers and collects the data from and about users' Web journeys, user's entry/exit pages, page views, referral pages, landing pages, page level, and so on 1904. As well, data is gathered and collected from and about the users' browsing patterns, such as time of day, day of the week, time on a website, and time on a page 1904. As well, data is gathered and collected from and about behavior characteristics, such as data from chat transcripts 1904.

Further, after gathering, collecting, and analyzing the data above, the system models for a best chat acceptance rate. More particularly, the system derives a statistical model to compute a probability score for each hot lead based on significant key variables 1906. Further detail about deriving the statistical model is provided hereinbelow in the following section. Thus, the probability of chat acceptance is a function of the significant key variables mentioned above 1906. Thus, based on the results of the model and probability of chat acceptance, the system is able to determine to whom to offer chat as well as estimate an average order value (AOV) in the case of a sales chat.

The amendment provides a real time scoring engine to generate and assign scores to site or page visitors 1908. After scores are generated and assigned to such visitors, the system causes chat to be offered to those visitors with high scores. The score as such is a probability of acceptance score that varies between 0 and 1. For example a score of 0.5 or above may be considered high. It should be appreciated determining the actual high or threshold score depends on the chat taking capacity.

Multivariate Modeling to Structure Rule Optimization

An embodiment provides multivariate modeling to structure rule optimization. An embodiment can be understood with reference to FIG. 20. FIG. 20 is a schematic diagram having two tables for an example model. The first table 2002 shows example key attributes that influence the chat acceptance rates. The second table 2004 shows an example statistical model for estimating the probability of chat acceptance. Thus, it should be appreciated that the response to be optimized is chat acceptance rate. Examples of key attributes influencing chat acceptance rates are, but are not limited to, the following: entry/exit/journey history; time on page; time of site; page views; search behavior; time of day/day of week; issue/page type; page level; recency of previous visit; and chat transcript data 2002.

WAIT TIME AND QUEUE CHOICES: PREDICTING CUSTOMER CHOICES

It should be appreciated that some state of the art wait time distribution models assume some type of homogenous distribution of wait time for customers. However, an embodiment takes into account a wait time distribution with multiple alternatives. For example, if a person is waiting outside a restaurant, how long they wait and when this person switches to another option may depend on what options are available to the person at that point. The person and his or her friends may talk about eating in the bar versus going into the restaurant. There is a certain wait time after which there is a switch. Thus, an embodiment considers comparing each of these situations as a channel in the contact center world. That is, in an embodiment, the modeling for wait time is based on, but not limited to, additional parameters, such as for example, alternative channels available to the customer for receiving the same service; the customer profile; and propensity value reflecting a propensity to those alternatives, etc.

Thus, an embodiment provides wait time distributions that take into account alternatives to waiting when optimizing customer service across multiple channels.

Thus, an embodiment provides a different dimension to the wait time problem. For example, in accordance with the embodiment, the system offers customer service opportunities through a call center, through chat, through self service over the Web, and through assisted self service.

Thus, given alternative channels or options, a particular customer's wait time behavior on any of such channels may depend not only on the customer's profile and independent variables related to the customer's behavior, but also on how aware the customer is of such other channels. An embodiment answers the question, what happens if an organization plays a message when somebody's waiting on a call saying that the person has the opportunity to solve his or her problem over chat, over self service on the Web, and so on? An embodiment provides an answer to how such alternatives and the knowledge by a customer of such alternatives impact customer service.

An embodiment provides X channels, e.g. X1, X2, X3, . . . , XN channels, where each channel has Y interactions. Further, given the Y interactions, an embodiment provides one or more ways for optimizing the system of X channels and Y interactions to maximize one or more of the different parameters of interest, such as first call resolution (FCR), customer satisfaction (CSAT), cost, etc. The problem would be structured as a classic optimization problem where the objective function would be to minimize/maximize one of the following variables: Customer satisfaction (CSAT), Issue Resolution %, Productivity, cost or revenues. The decision variables may be the population in any given segment that is directed to a particular channel Xi. Constraints may be related to cost or capacity.

An embodiment provides one or more algorithms for minimizing cost and maximizing FCR and CSAT. The optimization algorithms could be classic linear/non-linear programming algorithms depending on the complexity of the design, constraints, and the objective function being optimized. It should be appreciated that the wait time itself is a function of the options available to people. The wait time is not an independent variable, but depends on, but is not limited to, the number of options available to the people. Thus, the problem becomes a fairly complex optimization problem, which an embodiment solves by maximizing one or more such variables.

Alternatives to Wait

In an embodiment, alternatives to wait include chat, self service, and assisted self service. As stated above, an embodiment provides a highly predictive service system which has X channels and Y agents in each one of the service channels for maximizing low cost, FCR, and CSAT. It should be appreciated that an agent may be, but is not limited to, a human. An embodiment contemplates an agent may be an artificial intelligent mechanism, for example.

An Example

Consider, for example, that the system provides chat, Web self service, and Web assisted self service. Further, assume that the system has four channels: X1, X2, X3, and X4. Typically such channels may be common customer service channels such as voice calls, chats, self-service, and emails. Assume that the four channels have Y interactions: Y1, Y2, Y3, Y4, respectively. Thus, the number of interactions across the four channels is Y1 plus Y2 plus Y3 plus Y4.

In an embodiment, for each one of these interactions, the system determines and assigns a CSAT, where the CSAT is a function of the wait time, the channel type and the customer profile. In an embodiment, a customer profile may be a function of weblogs, Web behavior, CRM data about the customer contact history, customer geo-demographic, etc. Thus, the number of interactions in each of the channels, e.g. the sum of Y1, Y2, Y3 and Y4, and the wait time in each of the channels, i.e. waiting for an interaction, are determinants of CSAT, FCR, and so on.

It should be appreciated that the number of interactions in some way determines the wait time. Essentially the number of interactions is a function of both the wait time and the number of agents. That is, an embodiment provides a function, which controls the wait time, and because of the wait time, the wait time in turn controls some of the metrics, such as CSAT, FCR and so on. Thus, an embodiment solves the complex optimization problem that maximizes FCR, CSAT, etc. and/or minimizes cost. Further, such solution is generated through controlling the wait times and the number of agents.

Apparent or Perceived Time

Apparent or perceived time according to an embodiment can be understood with reference to the following example Suppose a person is stranded in the middle of the night with no gas in his or her car and that person is calling a roadside service. The perceived time for that person might be much longer than actual time. More particularly, suppose that person waited five minutes in the middle of the night during the winter for roadside service. Suppose another person is sitting on his or her sofa watching TV, is browsing, and in the meantime is calling his or her telephone service provider to change a plan. Suppose that other person also waits for five minutes. It is imaginable that the first person would say he or she waited for 20 minutes whereas the second person would say he or she waited for two minutes. Thus, the example illustrates perceived wait time versus real wait time.

An embodiment provides an algorithm that mathematically treats perceived time through a perception ratio, which can be normalized based on certain attributes of the issue type and certain attributes of the customer profile.

According to an embodiment, the wait time that matters, e.g. is used in computations, is not the real wait time but perceived wait time. That is, in an embodiment, the wait time used in computations is perceived wait time that is a function of customer profile and issue profile.

Repeat Visits

An embodiment uses customer data, such as history data, profiling data, etc., to intervene for a particular customer and serve such customer before his or her "magical" wait time (where he or she loses patience). For example, in an embodiment, a "repeat visitor" may be one such attribute for profiling. A person who is a repeat visitor may have a propensity to switch at a smaller wait time.

AN EXAMPLE MACHINE OVERVIEW

Figure 21:
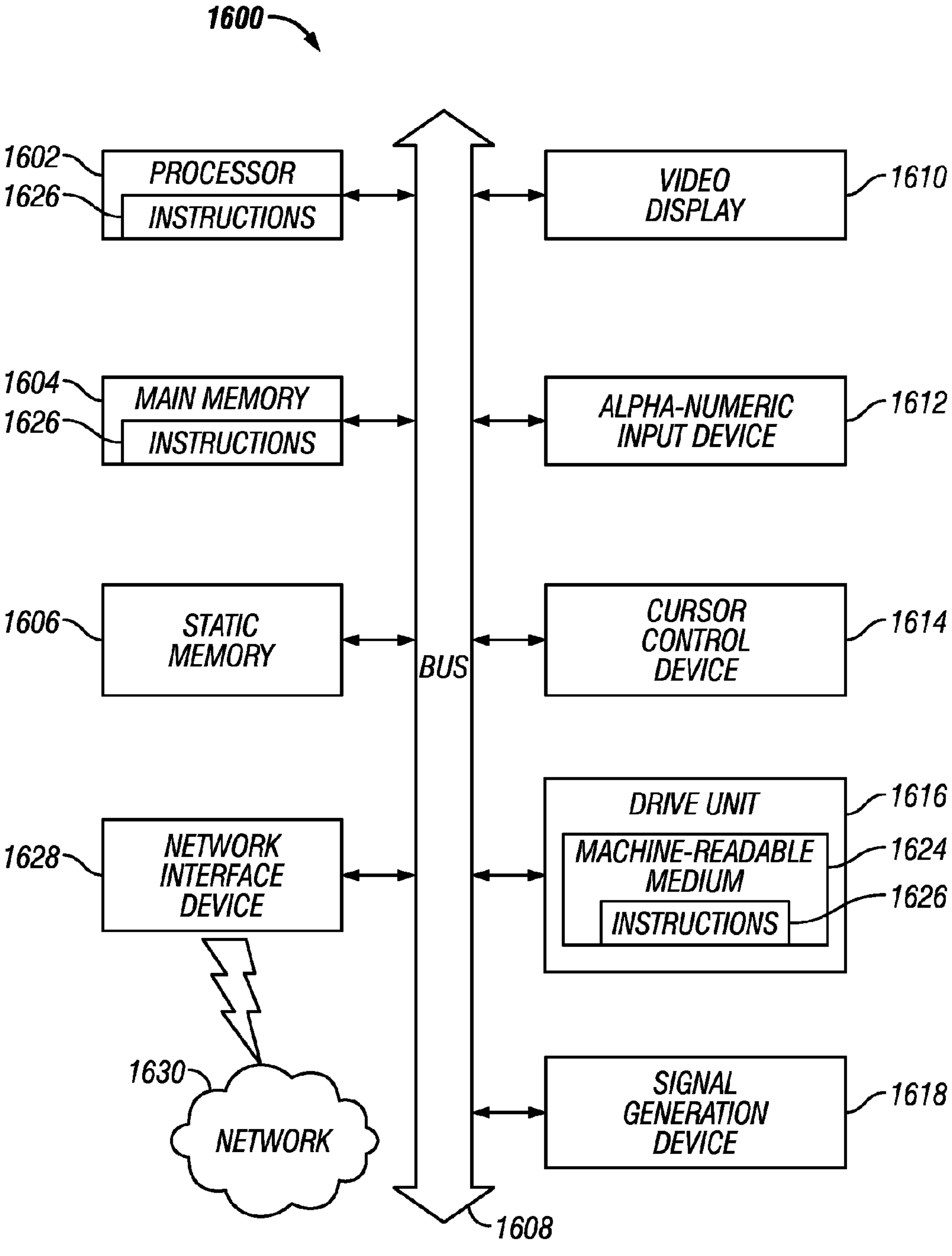
FIG. 21 is a block schematic diagram of a system in the exemplary form of a computer system according to an embodiment.

FIG. 21 is a block schematic diagram of a system in the exemplary form of a computer system 1600 within which a set of instructions for causing the system to perform any one of the foregoing methodologies may be executed. In alternative embodiments, the system may comprise a network router, a network switch, a network bridge, personal digital assistant (PDA), a cellular telephone, a Web appliance or any system capable of executing a sequence of instructions that specify actions to be taken by that system.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1620.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1628, 1630 by means of a network interface device 1620.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complimentary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer-implemented method for converting interactions from a call channel to any of a chat channel, a self-service channel, and an assisted self-service channel, or for preventing interactions at said call channel by offering a chat channel, a self-service channel, and an assisted self-service channel, comprising the steps of:

for a user call received from a call channel in a multi-channel system comprising each of a call channel, a chat channel, a self-service channel, and an assisted self-service channel, providing, by a call deflection processor, a call deflection strategy, said call deflection strategy automatically, and without involving an agent, causing said user on said call channel to be switched to any of said chat channel, self-service channel, and assisted self-service channel when said call deflection strategy is successful, wherein said call deflection strategy comprises:

applying, by said call deflection processor, an application of one or more statistical model to identify distributions for call arrival, call wait time, and call abandon time and using the distributions thereof to determine when to play a message during a customer's wait time;

performing with said call deflection processor a design of experiments to understand behavior of a customer during a wait time of the customer;

using, by said call deflection processor, attributes from a customer profile to determine how said attributes affect customer behavior when a message is played and subsequently determining when and what message is played for said customer during said customer's wait, wherein said attributes comprise any of customer history of issues, demographics, and geography; and managing, by said call deflection processor, buffer capacity provided by proactive chat for said Web containment strategy; and, in coordination therewith for a user on a particular Web page in said multi-channel system, providing, by a Web containment processor, a Web containment strategy, said Web containment strategy automatically, with or without involving an agent, causing said user on said particular Web page to stay on said Web page and not switch to a call channel when said Web containment strategy is successful, said causing being effected by any of inviting the user to said chat channel, presenting the user with self-service opportunities on said self-service channel, and presenting the user with assisted self-service opportunities on said assisted self-service channel, wherein said Web containment strategy comprises:

identifying, by said Web containment processor, top call driver pages;

identifying, by said Web containment processor, Web journeys that correspond to each call driver page;

computing, by said Web containment processor, Web traffic on the call driver pages and on the pages of the corresponding Web journey; and based in part on said computed Web traffic, computing by said Web containment processor an estimation of chat volume.

2. The method of claim 1, further comprising:

determining, by a determining processor, a number of individuals waiting on said call channel or waiting on a particular Web page at a given time.

3. The method of claim 1, further comprising:

determining, by a determining processor, which particular message from a set of messages to present to the caller on the call channel or the user on the Web page and when to present said message.

4. The method of claim 1, wherein said caller is one of two types:

a caller who may potentially abandon the call; and a caller who may potentially wait too long.

5. The method of claim 1, wherein said call deflection strategy comprises applying a structured design of experiment approach, said approach incorporating any of:

interactive voice response (IVR) message;

length and content of a chat URL announced on the IVR;

chat invite and pre-chat form design;

ability to measure and forecast chat volumes of:

proactive chat, button chat, and call deflection; and build and use a buffer.

6. The method of claim 1, further comprising:

providing, by a targeting processor, a targeting user strategy, said targeting user strategy applying a derived statistical model to compute a chat acceptance score for a user and when said chat acceptance score exceeds a particular threshold, offering the user to interact on a chat channel.

7. The method of claim 1, further comprising:

computing, by a processor, an estimated number of chat agents based on said computed estimated chat volume.

8. The method of claim 1, wherein said Web containment strategy comprises:

determining, by a processor, voice call drivers based on customer relationship management (CRM) data; and targeting, by a processor, particular issue types based on said voice call drivers and an amenability of said drivers to be resolved over the Web.

9. The method of claim 8, further comprising:

Identifying, by a processor, customer journeys corresponding to the issue types;

determining, by a processor, uniform resource locators (URLs) corresponding to the customer journeys; and determining, by a processor, a hot lead rate based in part on a hierarchical level of the URL and attributes generated from customer behavioral attributes and customer journey attributes.

10. The method of claim 1, further comprising:

determining, by a processor, an acceptance rate from a multivariate model and using said acceptance rate to determine when to present a user with an invitation to chat.

11. The method of claim 1, further comprising:

identifying, by a processor, and servicing, by a servicing processor, optimal segments of URLs based in part on exit rates and user ratings of said URLs.

12. The method of claim 1, further comprising:

using, by a processor text mining in part to identify pages to target for chat.

13. The method of claim 1, wherein a wait time of a customer is computed based on a multivariate model comprising additional parameters, said additional parameters comprising:

alternative channels to the customer for receiving same services;

a customer profile corresponding to the customer; and a propensity value reflecting a propensity to said alternative channels.

14. The method of claim 1, further comprising:

providing algorithms for minimizing cost and maximizing first call resolution and customer satisfaction based on a system of X number of channels, each channel Xi having Yi interactions, and wherein decision variables are the population in any given segment that is directed to a particular channel, Xi.

15. The method of claim 1, further comprising:

computing, by a processor, and using, by a processor, a perceiving time as a wait time, said perceived time based on a perception ratio that is normalized based on particular attributes of issue type and particular attributes of a customer profile.

16. The method of claim 15, wherein repeat visitor is an attribute in said customer profile and is used in determining said perceived wait time.

17. An apparatus for converting interactions from a call channel to any of a chat channel, a self-service channel, and an assisted self-service channel, or for preventing interactions at said call channel by offering a chat channel, a self-service channel, and an assisted self-service channel, said apparatus comprising:

for a user call received from a call channel in a multichannel system comprising each of a call channel, a chat channel, a self-service channel, and an assisted self-service channel, a call deflection processor for executing a call deflection strategy, said call deflection strategy automatically, and without involving an agent, causing said caller on said call channel to be switched to any of said chat channel, self-service channel, and assisted self-service channel when said call deflection strategy is successful, wherein said call deflection strategy comprises:

said call deflection processor applying one or more statistical model to identify distributions for call arrival, call wait time, and call abandon time and wherein the distributions thereof are used to determine when to play a message during a customer's wait time;

said call deflection processor performing a design of experiments to understand behavior of a customer during a wait time of the customer;

said call deflection processor using attributes from a customer profile to determine how said attributes affect customer behavior when a message is played and subsequently determining when and what message is played for said customer during said customer's wait, wherein said attributes comprise any of customer history of issues, demographics, and geography; and said call deflection processor managing buffer capacity by proactive chat for said Web containment strategy; and, in coordination therewith for a user on a particular Web page in said multi-channel system, a Web containment processor for executing a Web containment strategy, said Web containment strategy automatically, with or without involving an agent, causing said user on said particular Web page to stay on said Web page and not switch to a call channel when said Web containment strategy is successful, said Web containment processor executing any of inviting the user to said chat channel, presenting the user with self-service opportunities on said self-service channel, and presenting the user with assisted self-service opportunities on said assisted self-service channel, wherein said Web containment strategy comprises:

said Web containment processor identifying top call driver pages;

said Web containment processor identifying Web journeys that correspond to each call driver page;

said Web containment processor determining Web traffic on the call driver pages and on the pages of the corresponding Web journey; and based in part on said computed Web traffic, said Web containment processor determining an estimation of chat volume.

* * * * *